United States Patent [19]

Yamagata et al.

[11] Patent Number: 5,363,430
[45] Date of Patent: Nov. 8, 1994

[54] CORDLESS TELEPHONE APPARATUS HAVING A LOW POWER STAND-BY MODE AND A HOLD MODE

[75] Inventors: Masato Yamagata; Yoshikazu Tanaka, both of Kanagawa; Keizo Tsukada, Chiba, all of Japan

[73] Assignee: Sony Corporation, Tokyo, Japan

[21] Appl. No.: 54,617

[22] Filed: Apr. 28, 1993

Related U.S. Application Data

[63] Continuation of Ser. No. 630,329, Dec. 19, 1990, abandoned.

[30] Foreign Application Priority Data

Dec. 27, 1989 [JP] Japan .................................. 1-339232
Dec. 27, 1989 [JP] Japan .................................. 1-339239

[51] Int. Cl.$^5$ ............................................. H04M 11/00
[52] U.S. Cl. .................................... 379/61; 455/34.1; 455/38.3; 455/54.1
[58] Field of Search ................. 379/61, 162, 190, 393; 455/34.1, 34.2, 38.3, 127, 343, 54.1

[56] References Cited

U.S. PATENT DOCUMENTS

| | | | |
|---|---|---|---|
| 4,876,708 | 10/1989 | Saegusa et al. | 379/393 |
| 4,921,464 | 5/1990 | Ito et al. | 455/34.1 |
| 4,969,180 | 11/1990 | Watterson et al. | 379/61 |
| 5,003,587 | 3/1991 | Forbes | 379/393 |
| 5,023,932 | 6/1991 | Wakana | 379/61 |
| 5,237,603 | 8/1993 | Yamagata et al. | 379/61 |

FOREIGN PATENT DOCUMENTS 0265944 5/1988 European Pat. Off. .
0354049 2/1990 European Pat. Off. .
0089827 4/1989 Japan .

OTHER PUBLICATIONS

Patent Abstracts of Japan, vol. 11, No. 83 (E-489) 13 Mar. 1987 & JP-A-61 239 732 (Kyocera Corp.) 25 Oct. 1986.
Patent Abstracts of Japan, vol. 8, No. 161 (E-257) (1598) 26 Jul. 1984 & JP-59 061 322 (Toshiba Kabushiki Kaisha) Apr. 1984.
Patent Abstracts of Japan, vol. 12, No. 217 (E-624) (6034) 21 Jun. 1988 & JP-63 013 555 (Toshiba Kabushiki Kaisha) 20 Jan. 1988.
Patent Abstracts of Japan, vol. 12, No. 44 (E-684) (3287) 18 Nov. 1988 & JP-A 63 171 030 (Matsushita Electric Ind. Co. Ltd.) 14 Jul. 1988.
Patent Abstracts of Japan, vol. 13, No. 16 (E-703) (3364) 13 Jan. 1989 & JP-A-63 222 527 (Kanda Tsushin Kogyo K.K.) 16 Sep. 1988.

*Primary Examiner*—Curtis Kuntz
*Assistant Examiner*—Dwayne D. Bost
*Attorney, Agent, or Firm*—William S. Frommer; Alvin Sinderbrand

[57] ABSTRACT

A cordless telephone having a handset unit, which is powered by a battery, and a base unit for communicating with a desired party. A telephone conversation with the desired party may be interrupted by activating a hold mode. The hold mode is released by executing predetermined commands, for example, a talk request command. The hold mode is also released after a predetermined period has passed, whereupon the handset unit is placed in a relatively low power standby mode thus reducing the power consumption of the battery of the handset unit.

1 Claim, 15 Drawing Sheets

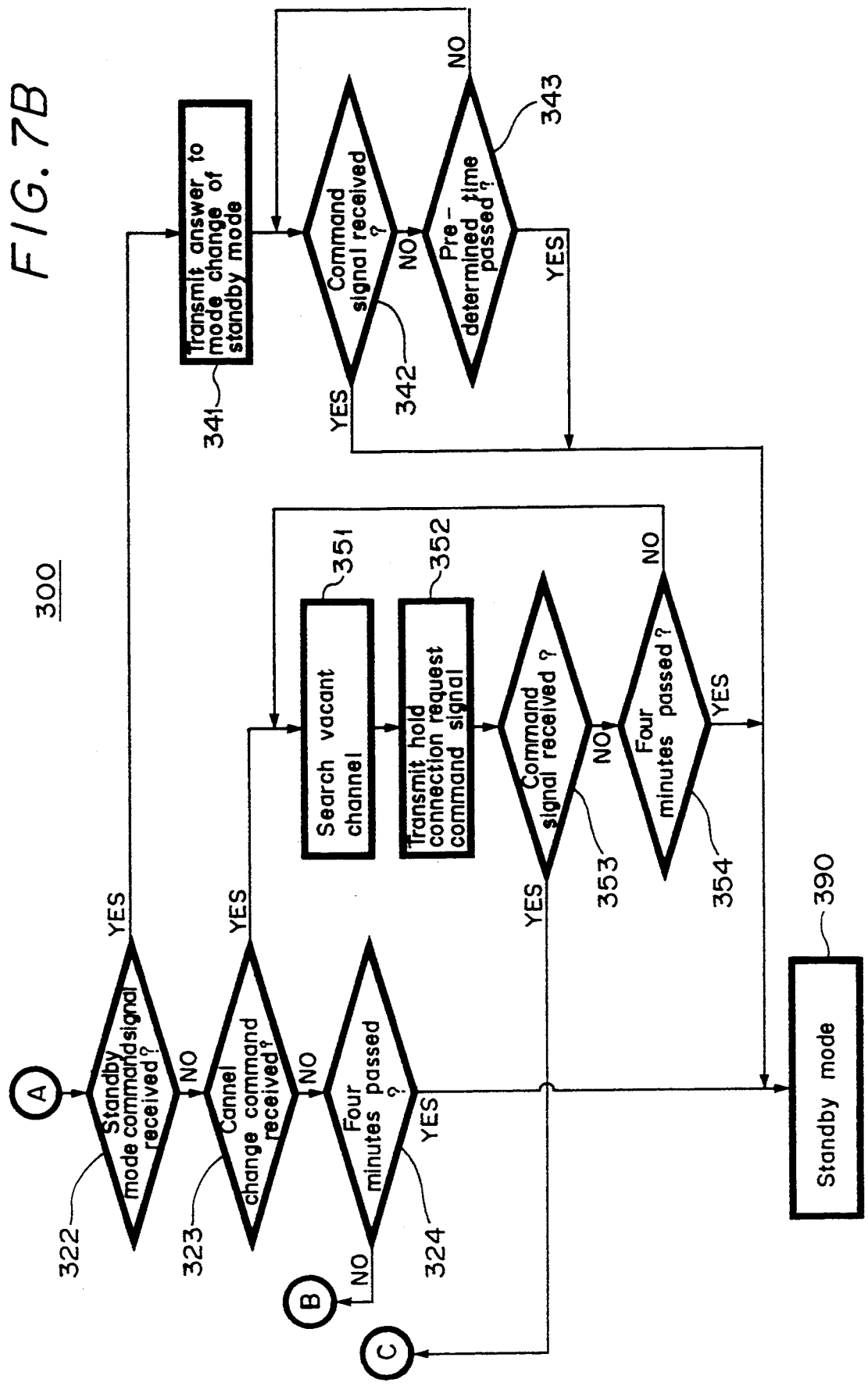

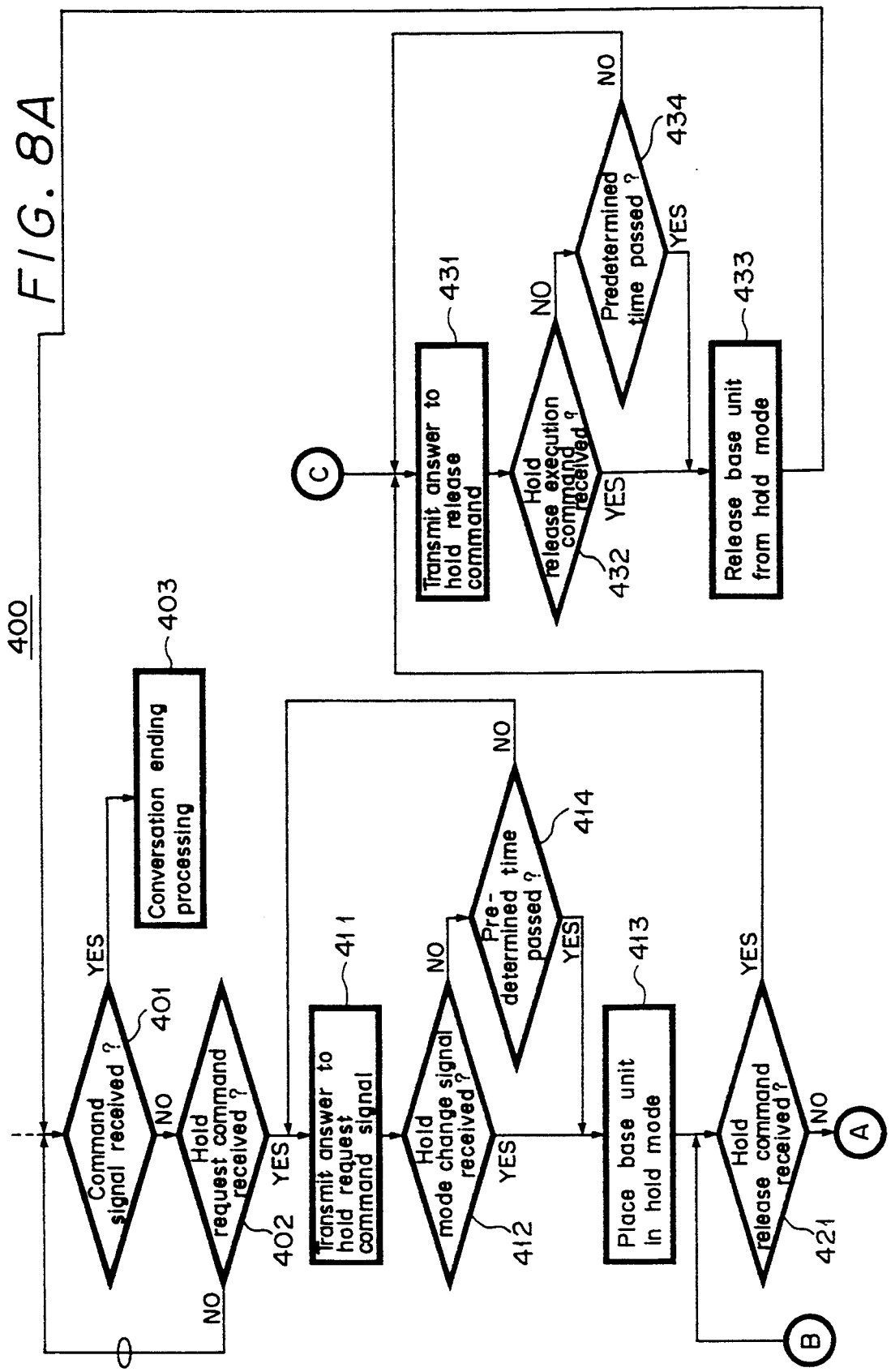

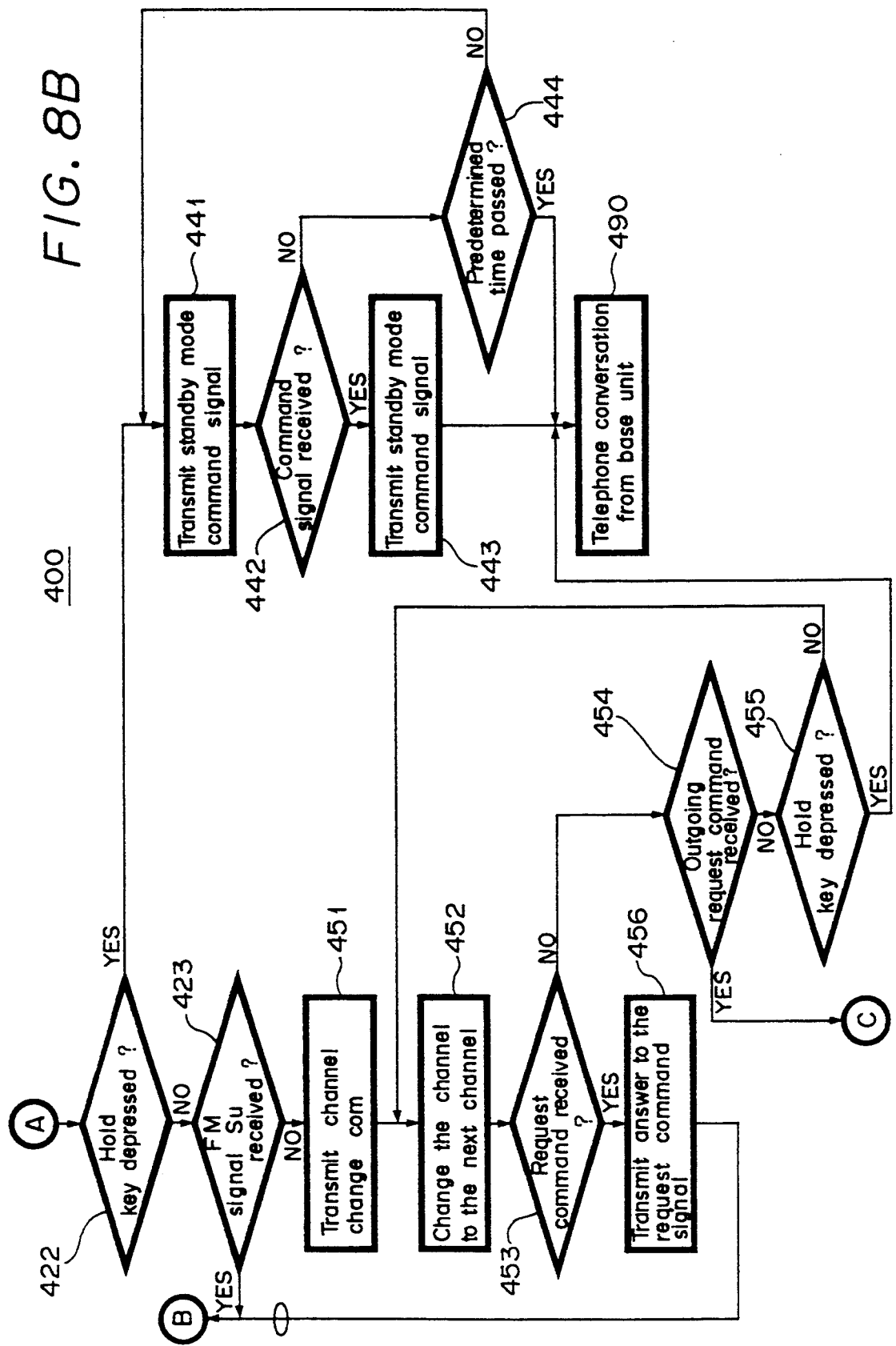

FIG. 9B
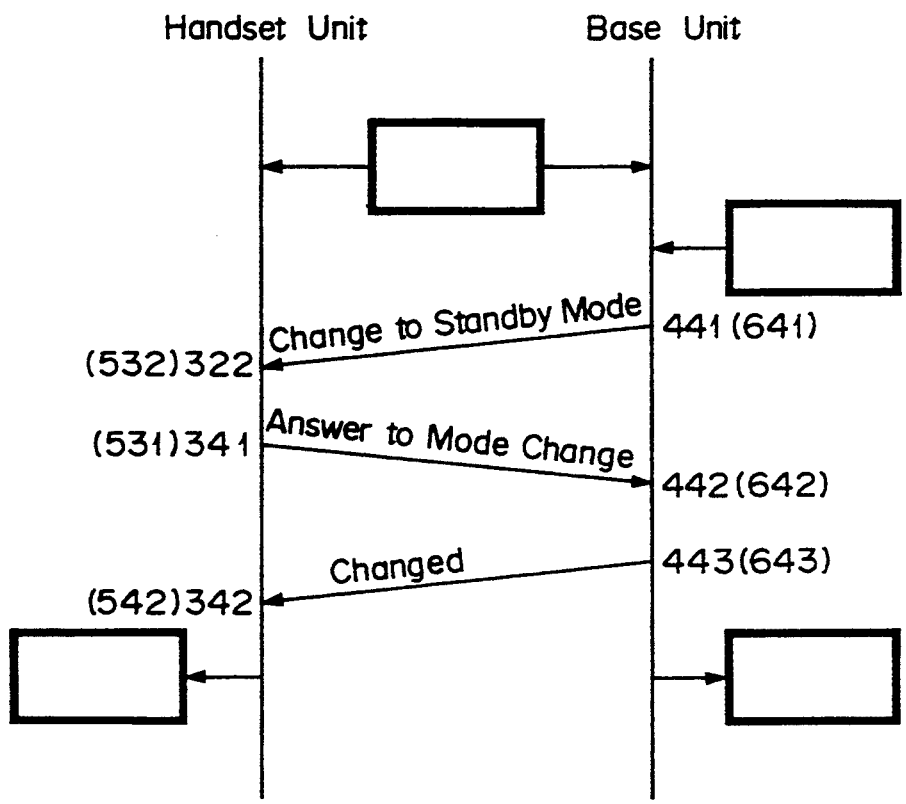
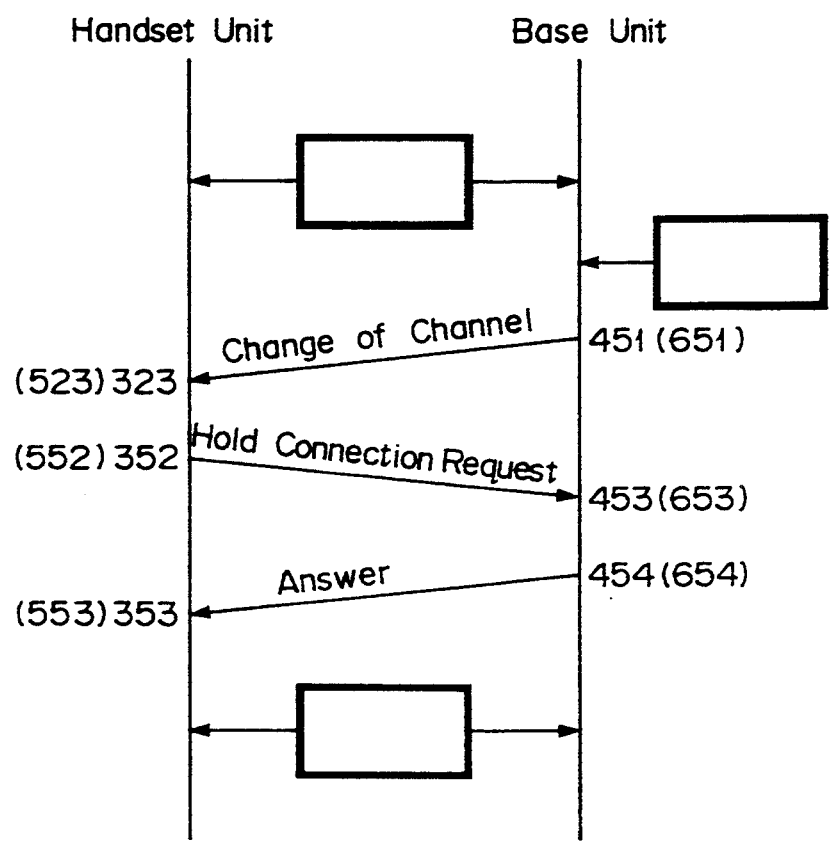

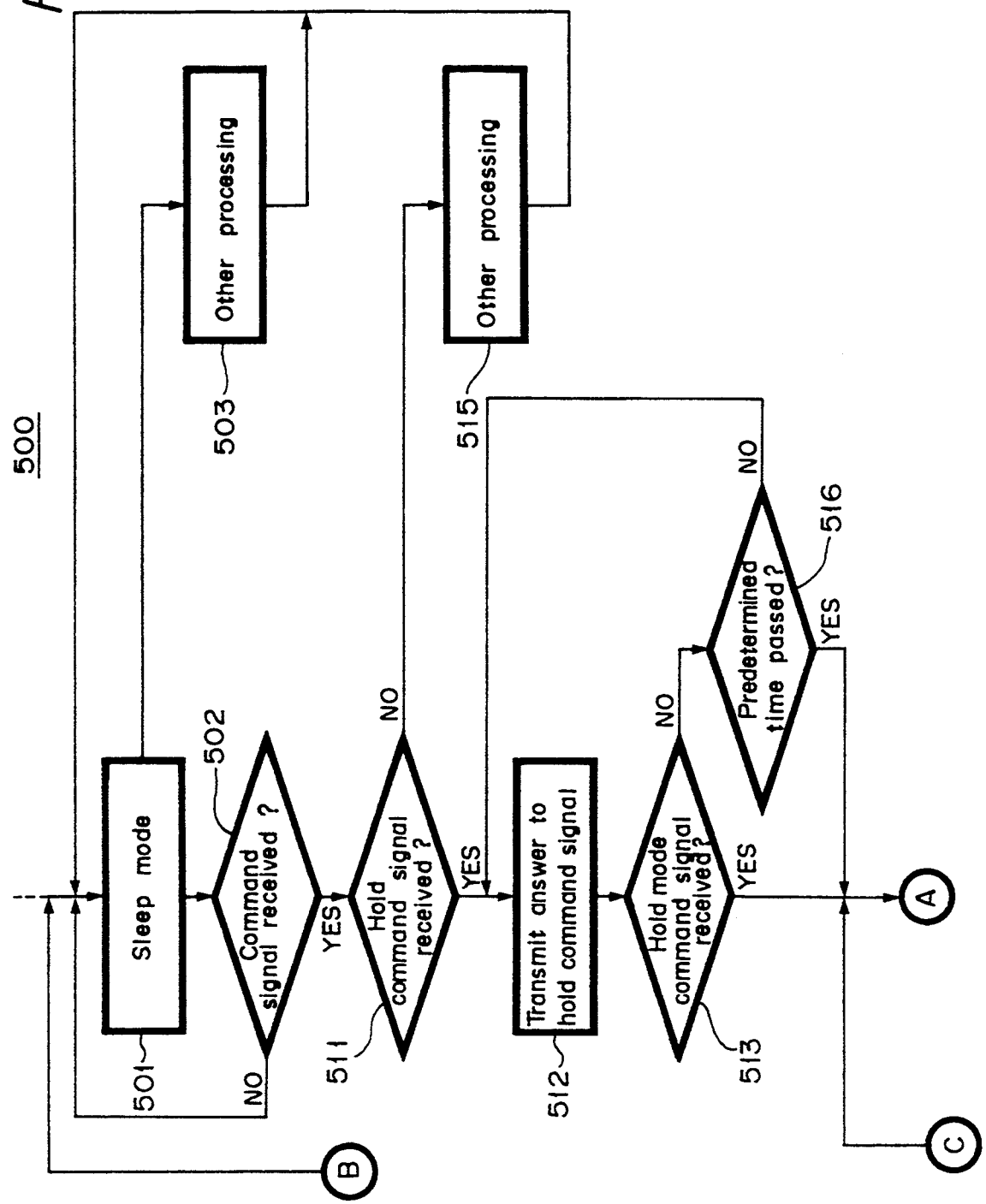

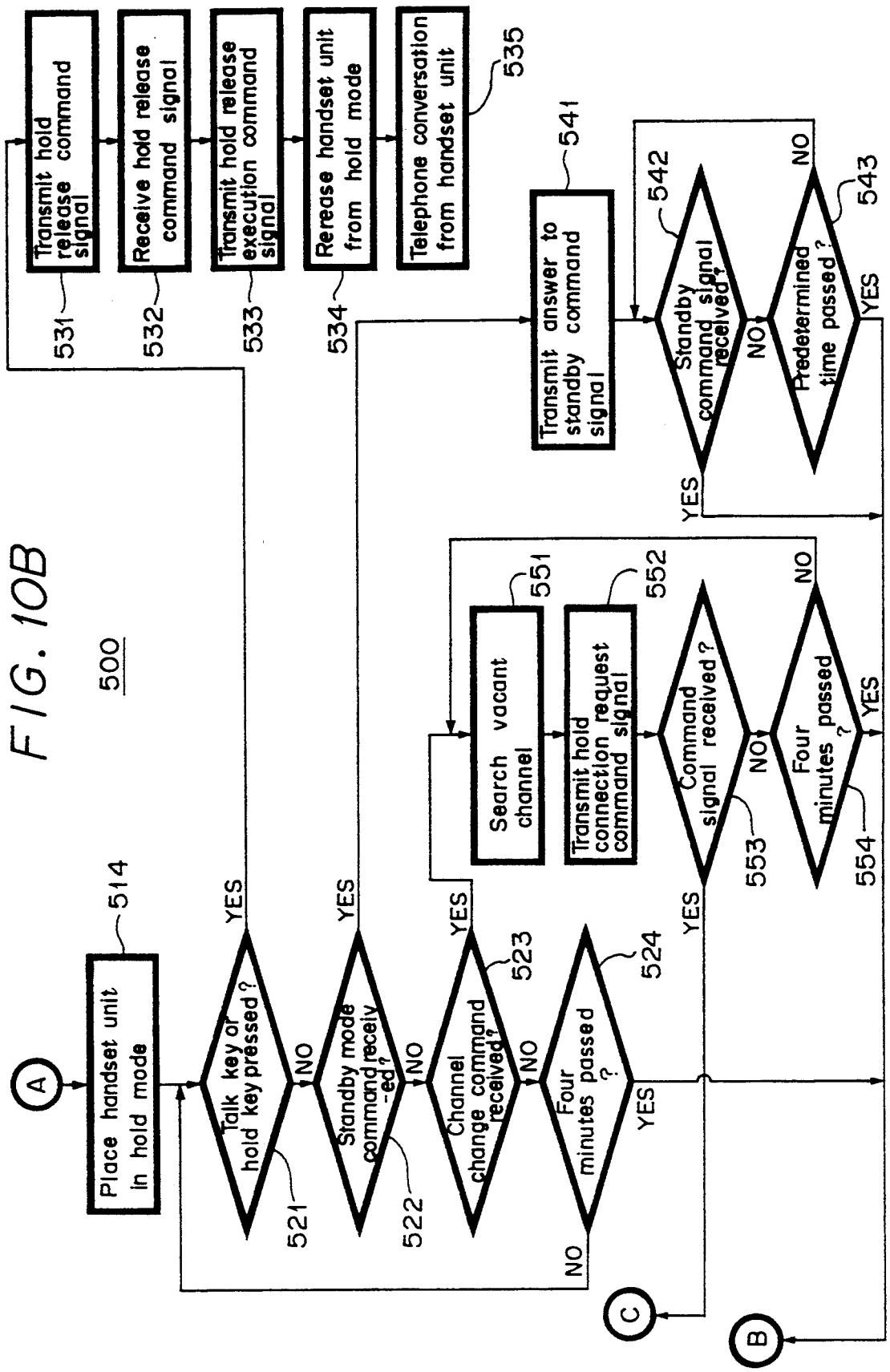

CORDLESS TELEPHONE APPARATUS HAVING A LOW POWER STAND-BY MODE AND A HOLD MODE

This application is a continuation of application Ser. No. 07/630,329, filed Dec. 19, 1990, (now abandon).

BACKGROUND OF THE INVENTION

Field of the Invention

The present invention generally relates to cordless telephones and, more particularly, to a cordless telephone in which the power consumption of a battery can be reduced.

A cordless telephone available in the United States of America has 10 duplex channels, that is, channels 1–10, but does not have a control channel. Further, in Japan, a low power cordless telephone does not have a control channel. In the cordless telephone having no control channel, power consumption of a battery used in a handset unit may be reduced by a method proposed by persons having a duty to assign to the assignee of the present application, and which is generally illustrated in FIG. 1. Such method is particularly disclosed in U.S. patent application Ser. No. 07/621,846, filed Dec. 4, 1990, now abandoned.

More specifically, as shown in FIG. 1, a base unit (master station) is powered by a commercially available AC power source. In a standby mode, the first to tenth channels are sequentially received and monitored repeatedly while awaiting a connection request from the handset unit. The time necessary for detecting the connection request from the handset unit is approximately 120 milliseconds per channel. Accordingly, all the channels are scanned in a cycle of about 1.2 seconds.

In the standby mode, the handset unit (remote station) receives and monitors predetermined channels, for example, the third and seventh channels, for checking whether or not a connection request from the base unit was sent. If no such connection request is received, then the handset unit enters a sleep mode of, for example, about 3.5 seconds. This cycle is repeatedly performed by the handset unit.

Accordingly, the handset unit is placed in a sleep mode during most of the standby mode. Therefore, the battery power consumption is reduced.

The arrangement and operation of such cordless telephone will be described more fully hereinafter. In the following explanation, the channels that the handset unit receives and monitors in the standby mode are the third and seventh channels.

FIG. 2 shows the arrangement of the above mentioned cordless telephone system which is mainly composed of a handset unit 1, a base unit 2 and a telephone line network 3 (external line).

In the handset unit 1, reference numerals 110 and 120 designate a transmitting circuit and a receiving circuit, respectively. The transmitting circuit 110 converts a sound signal St and a command signal CMND (which will be explained more fully later) into an FM (frequency-modulated) up-channel signal Su and transmits the same. The receiving circuit 120 receives and demodulates an FM down-channel signal Sd to provide a sound signal Sr and the command signal CMND. Further, the receiving circuit 120 detects limiter noise generated from, for example, an intermediate frequency amplifier and, as a result, generates a detection signal SQLC which indicates the presence or absence of the FM down-channel signal Sd.

Further, in the handset unit 1, reference numerals 131 and 132 designate a dial key and a talk key, respectively, in which the talk key 132 is a non-lock type push switch. Each time the talk key 132 is depressed, the handset unit 1 is alternately changed between the standby mode and the talk mode. In the standby mode, the handset unit 1 is set for making an outgoing call from the handset unit 1, and the handset unit 1 intermittently receives two channels, in this case, the third and seventh channels as shown in FIG. 1, and awaits a connection request from the base unit 2. In the talk mode, the handset unit 1 performs continuous reception and transmission between itself and the base unit 2.

Reference numerals 133 to 137 designate auxiliary keys such as a hold key and the like which may be formed of non-lock type push switches. Reference numeral 139 designates a speaker used for a ringer. A microcomputer 140 controls the entire system of the handset unit 1 and may, for example, be a one-chip type general-purpose microcomputer, such as Model No. $\mu$PD75108 manufactured by the NEC Corporation. The microcomputer 140 generates the command signal CMND which is transmitted by the transmitting circuit 110, and identifies the command signal CMND and the detection signal SQLC derived from the receiving circuit 120. Further, the microcomputer 140 generates control signals TCTL and RCTL that are used to respectively permit or inhibit the transmission and reception operations of the transmitting circuit 110 and the receiving circuit 120, to designate the channel and to perform muting.

Reference numerals 141 and 142 depict memories, that is, memory 141 is a read only memory (ROM) which stores therein a system identifying code SYID of 25 bits that is used to identify this cordless telephone from other cordless telephones. The memory 142 is a random access memory (RAM) for storing therein channel data CHDT which indicates the channel or channels which may be, received by the handset unit 1, for example, the third and seventh channels, in the standby mode.

Reference numeral 151 designates a battery which is preferably a rechargeable battery such as a nickel-cadmium battery. An output voltage signal from battery 151 is supplied to respective portions of the handset unit 1, thus providing the operation voltage. Reference numeral 161 depicts a light emitting diode (LED) which is used to indicate a hold state of the handset unit 1.

On the other hand, the base unit 2 includes a transmitting circuit 210 and a receiving circuit 220 which are substantially the same as the transmitting circuit 110 and the receiving circuit 120, respectively, of the handset unit 1. In the standby mode, the receiving circuit 220 awaits an incoming call from the telephone line network 3 and also is scanning all up-channels in order to receive a connection request from the handset unit 1 as shown in FIG. 1. In the talk mode, the base unit 2 performs continuous reception and transmission between itself and the handset unit 1.

Further, in the base unit 2, reference numerals 211, 221, 231, 232 and 239 designate a transmitter, a receiver, a dial key, a switch corresponding to a telephone hook switch and a speaker for a ringer respectively. Reference numerals 233 to 237 represent auxiliary keys, for example, a hold key, and may be formed of non-lock type push switches.

System control microcomputer 240 performs similar processings to those of the aforenoted microcomputer 140 and also controls the operation of the entire system of this cordless telephone. As with the microcomputer 140, the microcomputer 240 may be a one-chip type general-purpose microcomputer, such as Model No. μPD75108 manufactured by the NEC Corporation. Reference numerals 241 and 242 designate memories which correspond to the memories 141 and 142, respectively. The ROM 241 stores therein the system identifying code SYID and the RAM 242 stores therein the data CHDT indicative of the channel or channels which the handset unit 1 receives and monitors.

Further, in the base unit 2, reference numerals 261, 262, 263 and 264 designate a two-line to four-line converting circuit, a switch circuit that corresponds to a hook switch of a standard telephone set, a generating circuit for generating a dial tone signal (i.e. a DTFM signal), and a detecting circuit for detecting a ring tone signal, respectively.

FIG. 3 shows an example of a signal format of the command signal CMND. This command signal CMND includes a bit synchronizing signal BSYN of 24 bits at the head thereof and a frame synchronizing signal FSYN of 16 bits. In this case, the bit synchronizing signal BSYN and the frame synchronizing signal FSYN have specific bit patterns which may be expressed as follows:

BSYN="101010...10"

FSYN="1100010011010110"... up-channel

FSYN="1001001100110110"... down-channel

Following the signal FSYN, the command signal CMND further includes a system identifying code SYID of 25 bits, an error correction code ECC of 12 bits for this system's identifying code SYID, a dummy bit DBIT of 3 bits and a control code CTRL of 5 bytes (40 bits), in this order.

In the control code CTRL of 5 bytes, the fist byte CTL1 is a code indicative of the control contents of the handset unit 1 and the base unit 2, and the second byte CTL2 to fifth byte CTL5 are parameters, data and so on associated with the first byte CTL1.

When the handset unit 1 or the base unit 2 receives the command signal CMND, the microcomputer 140 or 240 respectively determines whether or not the identifying code SYID in the command signal CMND coincides with the identifying code SYID stored in the ROM 141 or 241. When the respective identifying codes are coincident with each other, the command signal CMND is regarded as being valid, otherwise the command signal CMND is regarded as being invalid.

In the standby mode, the operations shown in FIG. 1 or the operations shown in the upper portions of FIGS. 4 to 6 are carried out.

More specifically, in FIGS. 4 to 6, the solid lines in the vertical direction represent the conditions, along a time direction, of the handset unit 1 and the base unit 2. As is to be appreciated, these solid lines in the vertical direction are not drawn to scale along the time axis direction. The single solid lines represent the sleep mode, the double solid lines represent a mode in which only reception is permitted and the double solid lines with the hatched portions represent periods in which transmission and reception are permitted.

The handset unit 1 alternately and intermittently receives and monitors the down third and seventh channels in accordance with the channel data CHDT stored in the RAM 142, while the base unit 2 repeatedly scans all up-channels.

An outgoing call from the handset unit 1 to the external line 3 is performed as in the connection sequence shown in FIG. 4.

More specifically, if talk key 132 is depressed while the handset unit 1 is set in the standby mode, the depression of the talk key 132 is detected by the microcomputer 140, whereby the receiving circuit 120 is made operative to receive the down third channel or the down seventh channel as indicated by the channel data CHDT stored in the RAM 142. That is, one of the above-mentioned channels, for example, the third channel is vacant, and the reception channel of the receiving circuit 120 is fixed to the down third channel and continuous reception is thereafter permitted. Further, the transmitting circuit 110 is permitted to transmit through the up third channel, thus placing the handset unit 1 in the talk mode on the third channel.

Subsequently, the command signal CMND whose control code CTRL indicates the request to the outgoing call is repeatedly supplied from the microcomputer 140 to the transmitting circuit 110, whereupon the command signal CMND is converted into the FM signal Su of the up third channel and transmitted to the base unit 2 via an antenna 100.

Then, in the base unit 2, the signal Su, which is in the form of radio waves, is received by an antenna 200 and supplied to receiving circuit 220. Concurrently therewith, the receiving circuit 220 is repeatedly scanning all up channels so that, when the reception channel becomes the third channel, the receiving circuit 220 senses the arrival of signal Su and, as a result, generates the detection signal SQLC. The scanning of the receiving circuit 220 is then stopped at the third channel, whereupon the receiving circuit 220 demodulates the FM signal Su so as to provide the command signal CMND. This command signal CMND is supplied to the microcomputer 240 which determines whether or not the identifying code SYID in the command signal CMND coincides with the identifying code SYID stored in the ROM 241.

In this case, since the identifying codes SYID are coincident with each other and the control code CTRL in the command signal CMND indicates the request of the outgoing call, the transmitting circuit 210 is permitted by the microcomputer 240 to transmit in the corresponding channel in which the FM signal Su is received, that is, the down third channel. Accordingly, the base unit 2 is also placed in the talk mode on the third channel.

A command signal CMND which answers the request of the outgoing call is then supplied from the microcomputer 240 to the transmitting circuit 210, whereupon the command signal CMND is converted into the FM signal Sd of the down third channel and transmitted to the handset unit 1 via the antenna 200.

The FM signal Sd transmitted from the base unit 2 to the handset unit 1 through the down third channel is received by the antenna 100 and supplied to the receiving circuit 120, whereby the command signal CMND is generated by the receiving circuit 120 and supplied to the microcomputer 140.

Since the identifying code SYID in the command signal CMND is coincident with the identifying code SYID stored in the ROM 141 and the control code CTRL in the command signal CMND indicates the answer to the request of the outgoing call, the talk modes of the transmitting circuit 110 and the receiving circuit 120 in the third channel are established.

Accordingly, the handset unit 1 and the base unit 2 are connected via the third channel.

Further, in the base unit 2, the switch circuit 262 is placed in the off hook mode, whereby the transmitting circuit 210 and the receiving circuit 220 are connected to the telephone lines network 3 via the converting circuit 261 and the switch circuit 262.

Therefore, the handset unit 1 is connected to the telephone line network 3 via the base unit 2.

The user may now input a telephone number of a party to be called by using the dial key 131 of the handset unit. As a result, the command signal CMND, whose control code CTRL indicates the transmission of a telephone number and the corresponding telephone number, is generated and converted into the up channel FM signal Su and transmitted.

Accordingly, in the base unit 2, the receiving circuit 220 receives the Su signal and generates the command signal CMND, in which the control code CTRL of this command signal CMND indicates the transmission of a telephone number and the corresponding telephone number. As a result, the generating circuit 263, which is controlled by the microcomputer 240 in accordance with the telephone number, generates a dial tone signal corresponding to the telephone number supplied thereto from the handset unit 1. This dial tone signal is transmitted through the converting circuit 261 and the switch circuit 262 to the telephone line network 3.

When the called phone is answered, an audio signal Sr from the party being called is supplied to the transmission circuit 210 via a signal line formed of the telephone line network 3, the switch circuit 262 and the converting circuit 261, in that order. This audio signal Sr is thereon converted into the FM down channel signal Sd and transmitted by way of the antenna 200.

This signal Sd is received by way of antenna 100 of the handset unit 1 and supplied to the receiving circuit 120, whereupon the audio signal Sr is derived and supplied to the telephone receiver 121.

On the other hand, audio signal St from the telephone transmitter 111 is supplied to the transmitting circuit 110, so as to be converted into the FM signal Su of the up channel and transmitted by way of the antenna 100 to the base unit 2.

The signal Su is received by antenna 200 of the base unit 2 and supplied to receiving circuit 220, whereupon the signal St is generated. This signal St is supplied to the telephone line network 3 via the converting circuit 261 and the switch circuit 262, and is then transmitted to the telephone set of the other party.

As shown in FIG. 6, if the talk key 132 of the handset unit 1 is depressed, so as to indicate the completion of the telephone conversation, the command signal CMND whose control code CTRL indicates the termination of the telephone conversation is generated and transmitted to the base unit 2 on the FM signal Su of the up channel.

The receiving circuit 220 of the base unit 2 derives this command signal CMND and supplies the same to the microcomputer 240 which, in turn, determines that the telephone communication is finished. As a result, the transmitting circuit 210 is inhibited from transmitting and the receiving circuit 220 is placed in the standby mode in which it repeatedly scans all up channels. The switch circuit 262 is placed in the on hook mode.

Also in the handset unit 1, after the command signal CMND whose control code CTRL indicates the end of the telephone conversation has been transmitted, the transmitting circuit 110 is inhibited from transmitting and the receiving circuit 120 is placed in the standby mode in which it alternately and intermittently receives the down third and seventh channels.

An incoming call to the handset unit 1 from the external line 3 is received by the handset unit 1 according to a connection sequence as, for example, shown in FIG. 5.

More specifically, when an incoming call arrives through the telephone line network 3, the associated ring tone signal is detected by the detecting circuit 264, whereupon a detection signal is generated and supplied to the microcomputer 240 in the base unit 2. The receiving circuit 220 is set to receive a vacant channel from among those indicated by the channel data CHDT stored in RAM 242, that is, either the up third channel or seventh channel. For example, if the third channel is vacant, the reception channel of the receiving circuit 220 is fixed to the up third channel. Further, the transmitting circuit 210 is permitted to transmit in the down third channel. As a result, the base unit 2 is set in the talk mode in the third channel.

The command signal CMND, whose control code CTRL indicates a request of the incoming call, is then repeatedly supplied to the transmitting circuit 210 from the microcomputer 240, whereupon the command signal CMND is converted into an FM signal Sd of the down third channel and transmitted to the handset unit 1.

The signal Sd is received by the antenna 100 of the handset unit 1. Meanwhile the receiving circuit 120 alternately and intermittently scans repeatedly the down third and seventh channels in accordance with the channel data CHDT stored in the RAM 142. However, when the reception channel becomes the third channel, the receiving circuit 120 senses the signal Sd and, as a result, generates the detection signal SQLC. The scanning operation of the receiving circuit 120 is then stopped at the third channel, whereupon the receiving circuit 120 demodulates the FM signal Sd to provide the command signal CMND. A determination is then performed on whether or not the system identifying code SYID in this command signal CMND coincides with the system identifying code SYID stored in the ROM 141.

In this case, since the system identifying codes SYID are coincident with each other and the control code CTRL in the command signal CMND indicates the request of the incoming call, the transmitting circuit 110 is permitted to transmit in the corresponding channel in which the FM signal Su is received, that is, the up third channel. Therefore, the handset unit 1 is also set in the talk mode in the third channel.

The command signal CMND which answers the request of the incoming call is then supplied to the transmitting circuit 110 from the microcomputer 140, whereupon this command signal CMND is converted into the FM signal Su of the up third channel and transmitted to the base unit 2.

When the FM signal Su, which is transmitted from the handset unit 1 via the up third channel is received by the base unit 2, the command signal CMND is generated by the receiving circuit 220 and supplied to the microcomputer 240.

Since the system identifying code SYID in the command signal CMND is coincident with the system identifying code SYID stored in the ROM 241 and the control code CTRL in the command signal CMND indicates the answer to the request of the incoming call, the transmitting circuit 210 and the receiving circuit 220 are set in the talk mode in the third channel.

Accordingly, the handset unit 1 and the base unit 2 is established via the third channel.

Further, in the handset unit 1, the oscillation circuit 138, which is controlled by the microcomputer 140, generates a ringer signal. This ringer signal is supplied to the speaker 139 so as to cause the speaker 139 to produce a bell sound, thus announcing the arrival of the incoming call.

If the talk key 132 in the handset unit 1 is depressed so as to answer the incoming call, an answer command signal CMND whose control code CTRL indicates the depression of the talk key 132 is generated. This command signal CMND is converted to the FM Signal Su and transmitted in a manner as previously described. Further, the oscillation circuit 138 is turned OFF, thus turning off the ringer.

The transmitted signal Su from the handset unit 1 is received by the base unit 2 and demodulated to form the command signal CMND in a manner as previously described. As a result, the switch circuit 262 is placed in the off hook state so that a communication channel is opened between the handset unit 1 and the base unit 2, thus enabling telephone communication between the handset unit 1 and the called phone.

Further, the user can make an outgoing call, receive an incoming call and end a telephone conversation by the use of the dial key 231, the hook switch 232, the transmitter and receiver 211 and 221, respectively, the oscillation circuit 238 and the speaker 239 of the base unit 2, in a manner similar to that used in a standard telephone set. At this time, a communication channel is not opened between the base unit 2 and the handset unit 1.

The cordless telephone in which the base unit 2 is provided with the transmitter 211 and the receiver 221 may further include a hold function. As a result, when a telephone conversation is performed utilizing the handset unit 1, the handset unit 1 may be set in a hold mode and after a predetermined period of time, the base unit 2 releases the hold mode, whereby the telephone conversation may be resumed through the use of the transmitter 211 and the receiver 221.

In order that the handset unit 1 and the base unit 2 can be easily placed in the hold mode and released therefrom, the communication channel between the handset unit 1 and the base unit 2 must be kept open during the hold mode. This insures that a hold releasing command signal CMND can be accessed between the handset unit 1 and the base unit 2.

Typically, during a telephone conversation, the user holds the handset unit 1 in his or her hand in a manner such that the antenna of the handset unit 1 stands in a relatively upright position. When the user places the handset unit 1 in a hold mode, the user may place the handset unit 1 horizontally on a table or the like, whereupon the antenna of the handset unit 1 is also placed in a horizontal direction. As a result, the propagation of radio waves is hindered depending on the material of the table or the like. Thus, when the handset unit 1 is placed in a hold mode, the radio waves (that is, the FM signal Su) transmitted by the handset unit 1 and the radio waves (that is, the FM signal Sd) received by the handset unit 1 are in a deteriorated condition.

Accordingly, the base unit 2 may fail to receive a hold release command CMND and, as a result, the handset unit 1 will remain in the hold mode until the user switches the talk key 132 of the handset unit 1 to the standby mode, thereby consuming a relatively large amount of power from the battery 151.

OBJECTS AND SUMMARY OF THE INVENTION

Accordingly, it is an object of the present invention to provide an improved cordless telephone which can eliminate the aforenoted shortcomings and disadvantages encountered with the prior art.

More specifically, it is an object of the present invention to provide a cordless telephone in which the power consumption of a battery of a handset unit can be reduced considerably.

It is another object of the present invention to provide a cordless telephone in which a handset unit may be placed in a hold mode by a base unit and in which the telephone communication being held can be released by the handset unit, thereby resuming the telephone communication.

According to an aspect of the present invention, a cordless telephone comprises a base unit connected to a telephone line network for connection through the latter with a desired party; a handset unit operable upon opening of a communication channel for radio communication with the base unit and through the latter with the desired party; means for establishing a relatively low power standby mode in which the handset unit intermittently monitors at least one communication channel; means for establishing a hold mode in which communication between the handset unit and the desired party is inhibited; and means for monitoring the communication channel opened between the base unit and the handset unit for a predetermined period after initiation of the hold mode, and for placing the handset unit in the standby mode after the predetermined period.

According to another aspect of the present invention, a cordless telephone comprises a base unit connected to a telephone line network for connection through the latter with a desired party; a handset unit operable upon opening of a communication channel for radio communication with the base unit and through the latter with the desired party; means for establishing a relatively low power standby mode in which the handset unit intermittently monitors at least one communication channel; means for placing the base unit in a hold mode; means responsive to the base unit being placed in the hold mode for generating a hold mode control signal and for transmitting the same from the base unit to the handset unit through the communication channel opened between the base unit and the handset unit; means responsive to the hold mode control signal for placing the handset unit in the hold mode so as to inhibit communication between the handset unit and the desired party; and means for monitoring the communication channel opened between the base unit and the handset unit for a predetermined period after initiation of the hold mode, and for placing the handset unit in the standby mode after the predetermined period.

These, and other objects, features and advantages of the present invention will become apparent from the following detailed description of an illustrative embodiment to be read in conjunction with the accompanying drawings, in which like reference numerals are used to identify the same or similar parts in the several views.

BRIEF DESCRIPTION OF THE DRAWINGS

FIGS. 7A and 7B illustrate a flowchart to which reference will be made in explaining an operation of a handset unit of the cordless telephone according to an embodiment of the present invention;

FIGS. 8A and 8B illustrate a flowchart to which reference will be made in explaining an operation of a base unit of the cordless telephone according to the embodiment of the present invention.

FIGS. 9A and 9B are diagrams of protocols used to explain the present invention;

FIGS. 10A and 10B illustrate a flowchart to which reference will be made in explaining another operation of the handset unit.

DETAILED DESCRIPTION OF THE PREFERRED EMBODIMENT

An improved cordless telephone according to an embodiment of the present invention will now be described with reference to the drawings.

An operation in which the user utilizes a hold mode during a telephone conversation using the handset unit i will now be explained.

Figure 7A:
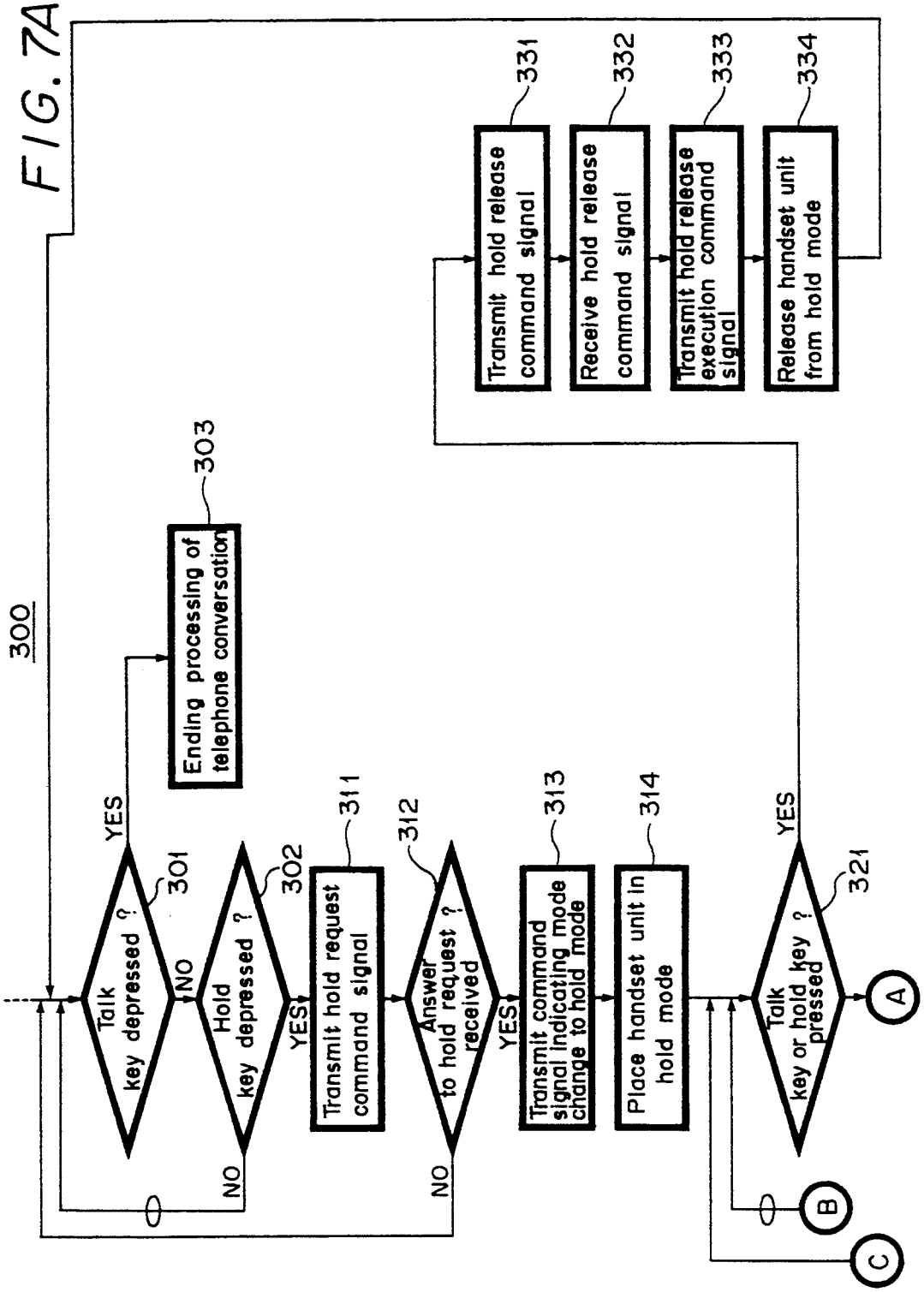

Routines 300 and 400 shown in the flowcharts of FIGS. 7 and 8 are processed by the microcomputer 140 of the handset unit 1 and the microcomputer 240 of the base unit 2, respectively.

Figure 9A:
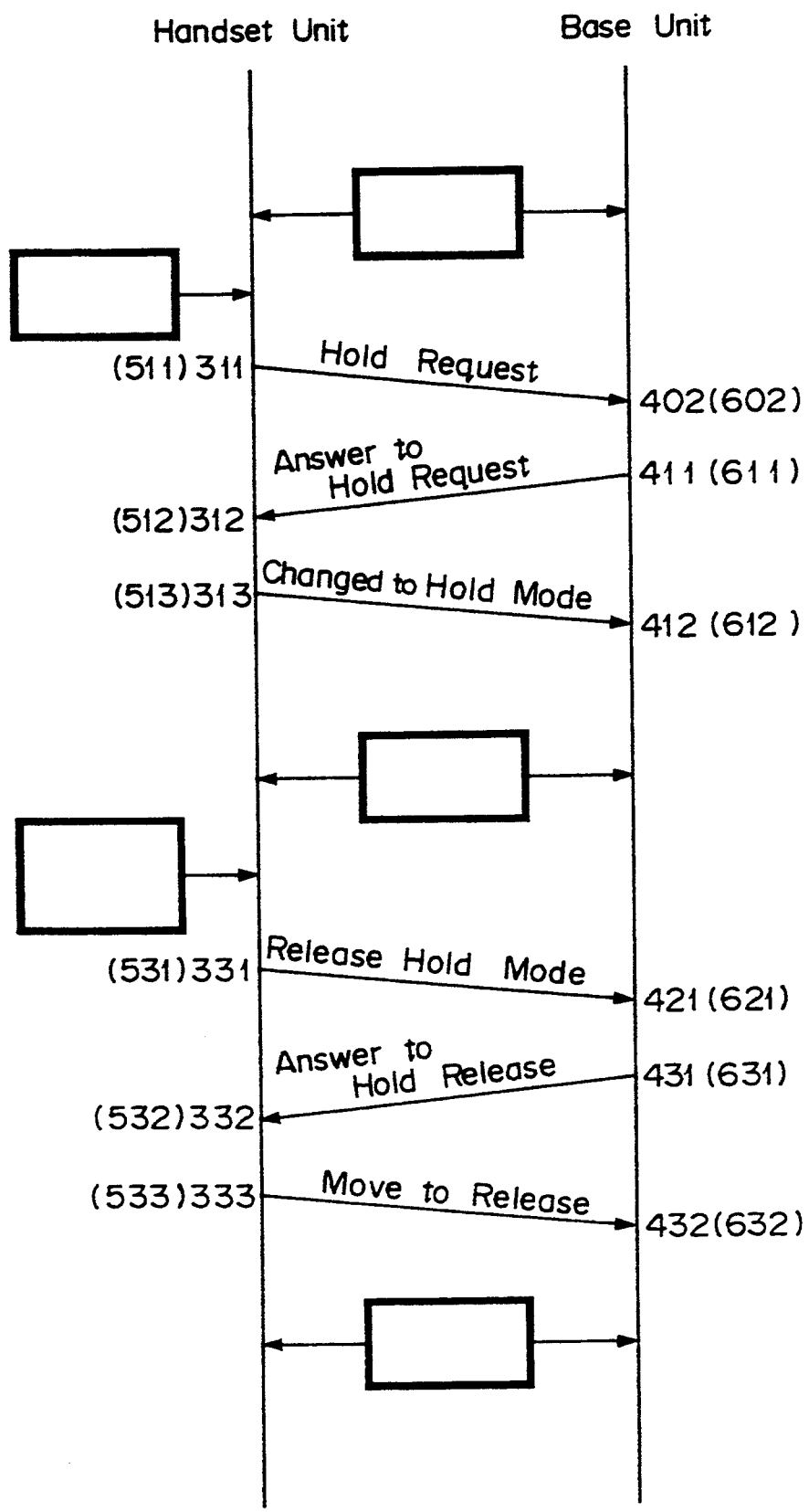

FIGS. 9A and 9B show protocols associated with the processing of the hold mode. The reference numerals on the two sides of FIGS. 9A and 9B identify the reference numerals of respective steps in the routines 300 and 400.

When telephone communication is made using the handset unit 1, steps 301 and 302 of the routine 300 are repeated in the handset unit 1. More specifically, it is determined at step 301 whether or not the talk key 132 is depressed so as to indicate an end of the telephone conversation. If the talk key 132 is not depressed as represented by a NO at step 301, thus indicating the continuation of the telephone conversation, the processing proceeds from step 301 to the next decision step 302. In step 302, it is determined whether or not the hold key 133 is depressed. If the hold key 133 is not depressed as represented by a NO at step 302, the processing returns from step 302 to step 301. Accordingly, during the telephone conversation, the conditions of the talk key 132 and the hold key 133 are monitored at steps 301 and 302, respectively.

Figure 6:
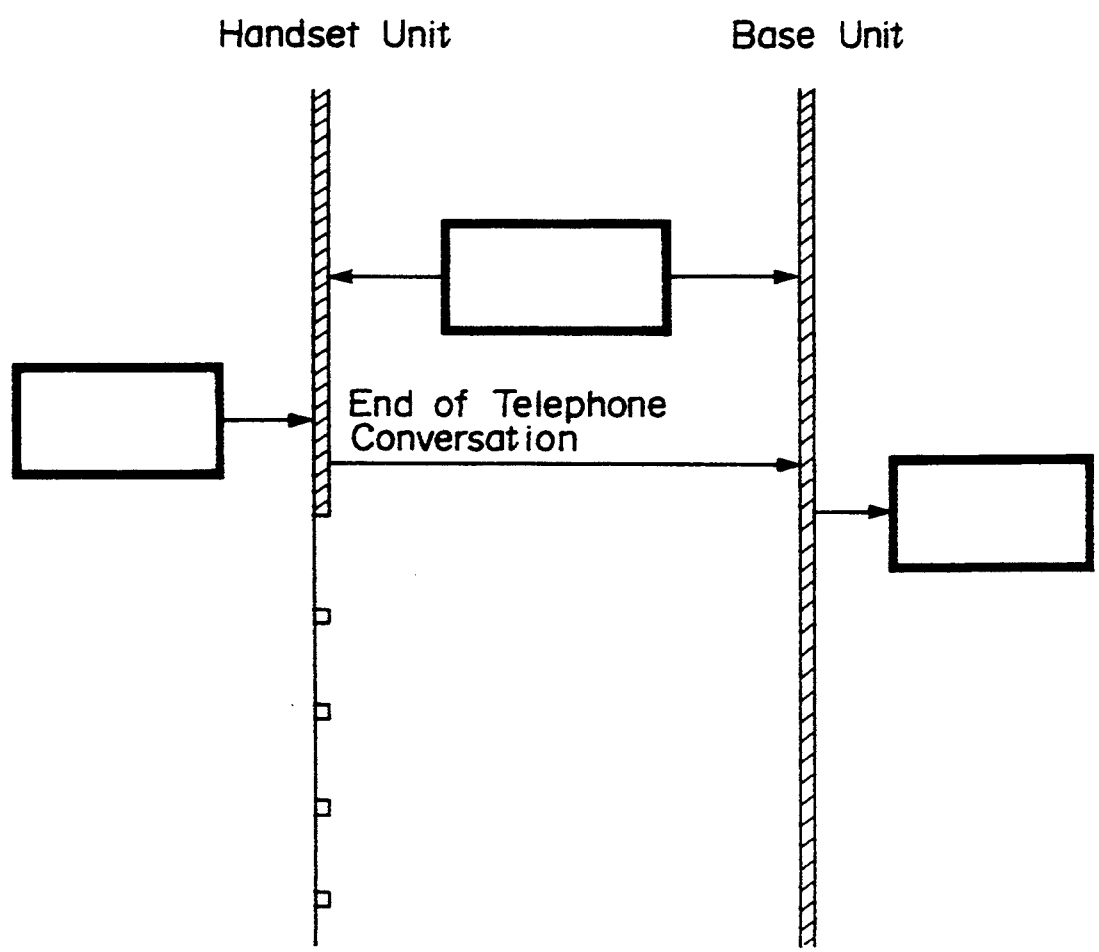
FIG. 6 is a diagram showing an operational sequence for terminating a telephone conversation.

On the other hand, if the talk key 132 is depressed during the telephone conversation, such depression of the talk key 132 is detected at step 301, as indicated by a YES thereat, whereupon the processing proceeds from step 301 to step 303. In step 303, the processing associated with ending the telephone conversation, which was previously explained with reference to FIG. 6, is executed.

Further, when the telephone conversation is performed using the handset unit 1, steps; 401 and 402 of the routine 400 shown in FIG. 8 are repeatedly executed in the base unit 2.

More specifically, it is determined in decision step 401 whether or not the command signal CMND which indicates the termination of the telephone conversation is received. If this command signal CMND is not received as represented by a NO at step 401, the processing proceeds from step 401 to the next decision step 402. It is determined in decision step 402 whether or not a command signal CMND requesting that the hold mode be engaged is received as more fully explained hereinafter. If the hold request command signal CMND is not received as represented by a NO at step 402, then the processing returns from step 402 to step 401.

Accordingly, throughout the telephone conversation, reception of the conversation terminating and hold request command signals CMND are continuously monitored at steps 401 and 402.

If the conversation terminating command signal CMND is received during the telephone conversation, as represented by a YES at step 401, then the processing proceeds from step 401 to step 403. In step 403, the processing associated with terminating the telephone conversation, which was previously explained with reference to FIG. 6, is executed.

If, on the other hand, the hold key 133 is depressed during the telephone conversation, as represented by a YES at step 302, then the processing proceeds from step 302 to step 311. In step 311, a command signal CMND whose control code CTRL indicates a hold request is generated and this command signal CMND is transmitted to the base unit 2. Then, the processing proceeds to the next decision step 312.

In step 402, the command signal CMND generated and transmitted in step 311 is detected, as represented by a YES, whereupon the proceeds from step 402 to 411. In step 411, a command signal CMND whose control code CTRL indicates an answer to the hold request is generated and this command signal CMND is transmitted to the handset unit 1. Then, the processing proceeds to the next decision step 412.

It is determined in step 312 whether or not the command signal CMND indicative of the answer to the hold request transmitted in step 411 is received. If the command signal CMND is not received as represented by a NO at step 312, then the processing returns from step 312 to step 301 whereat the handset unit 1 is again placed in the communication mode.

Figure 2:
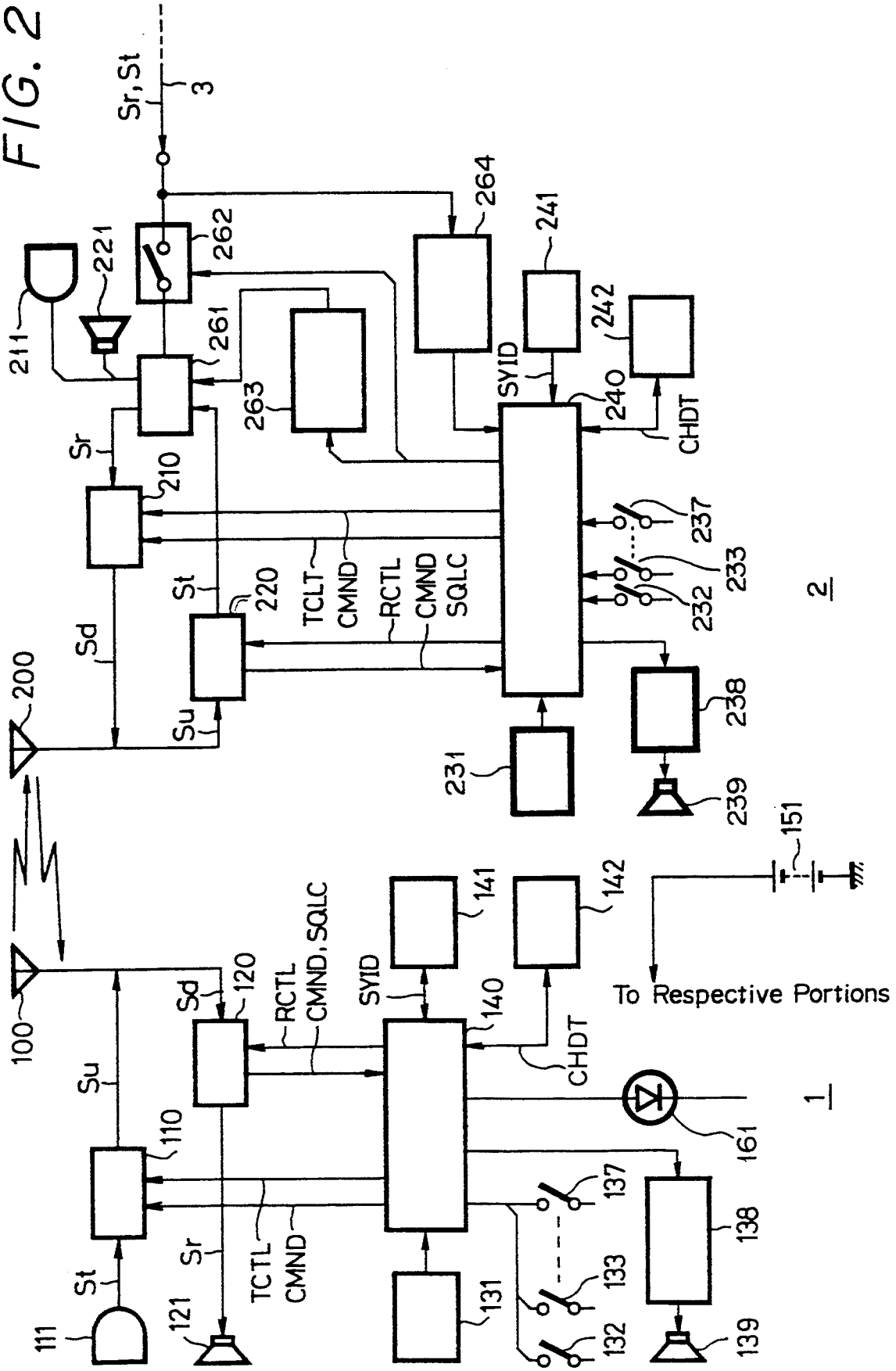
FIG. 2 is a schematic block diagram of a cordless telephone to which the present invention may be applied.
Figure 3:
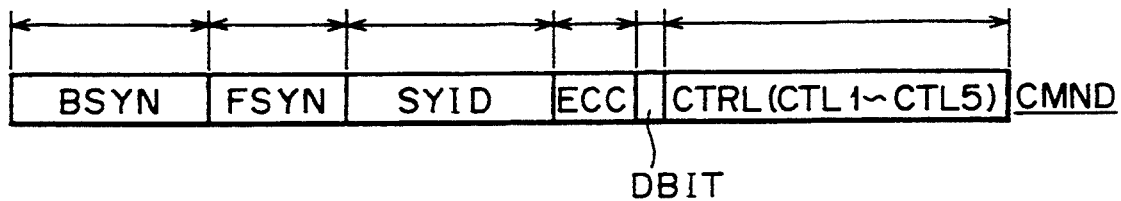
FIG. 3 is a diagram of a signal format used in the present invention.
Figure 4:
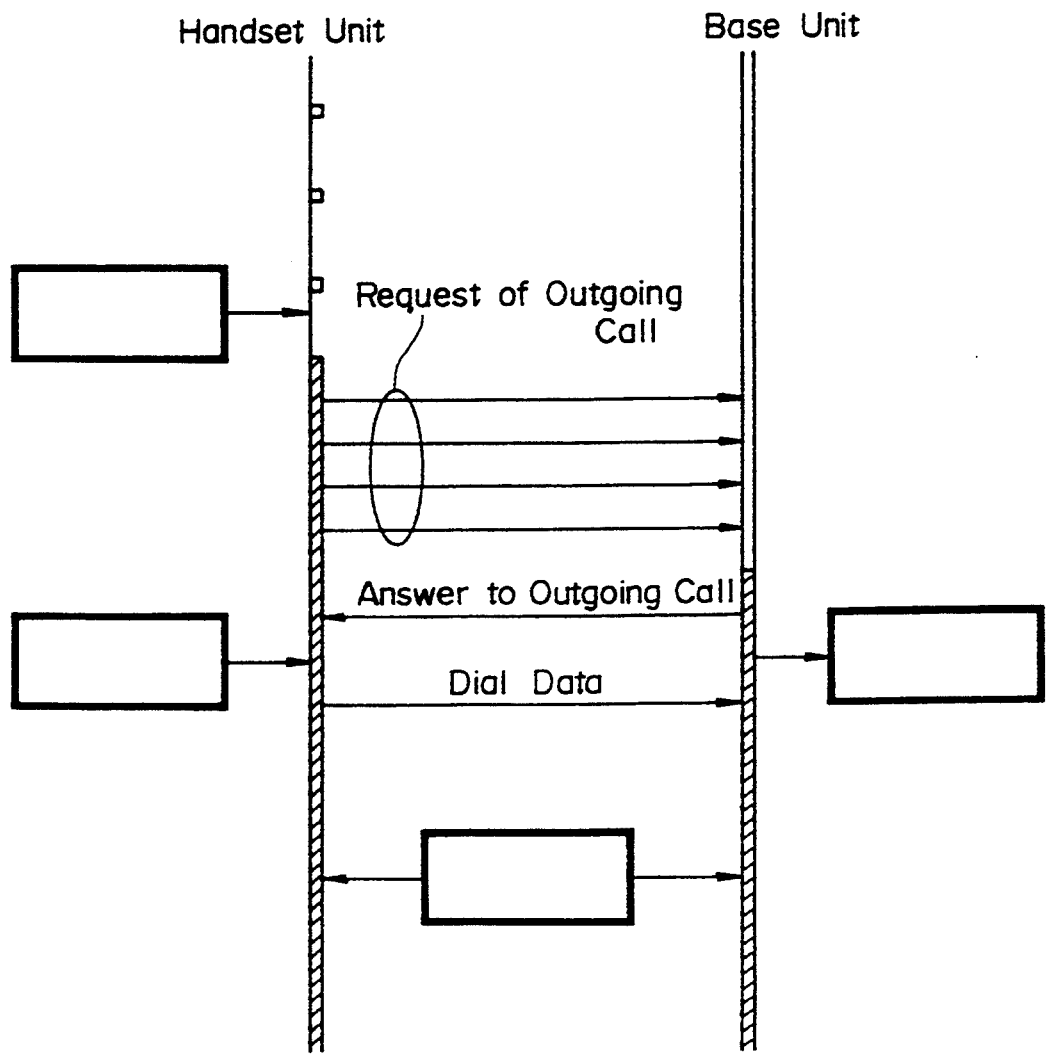
FIG. 4 is a diagram showing an operational sequence for an outgoing call.
Figure 5:
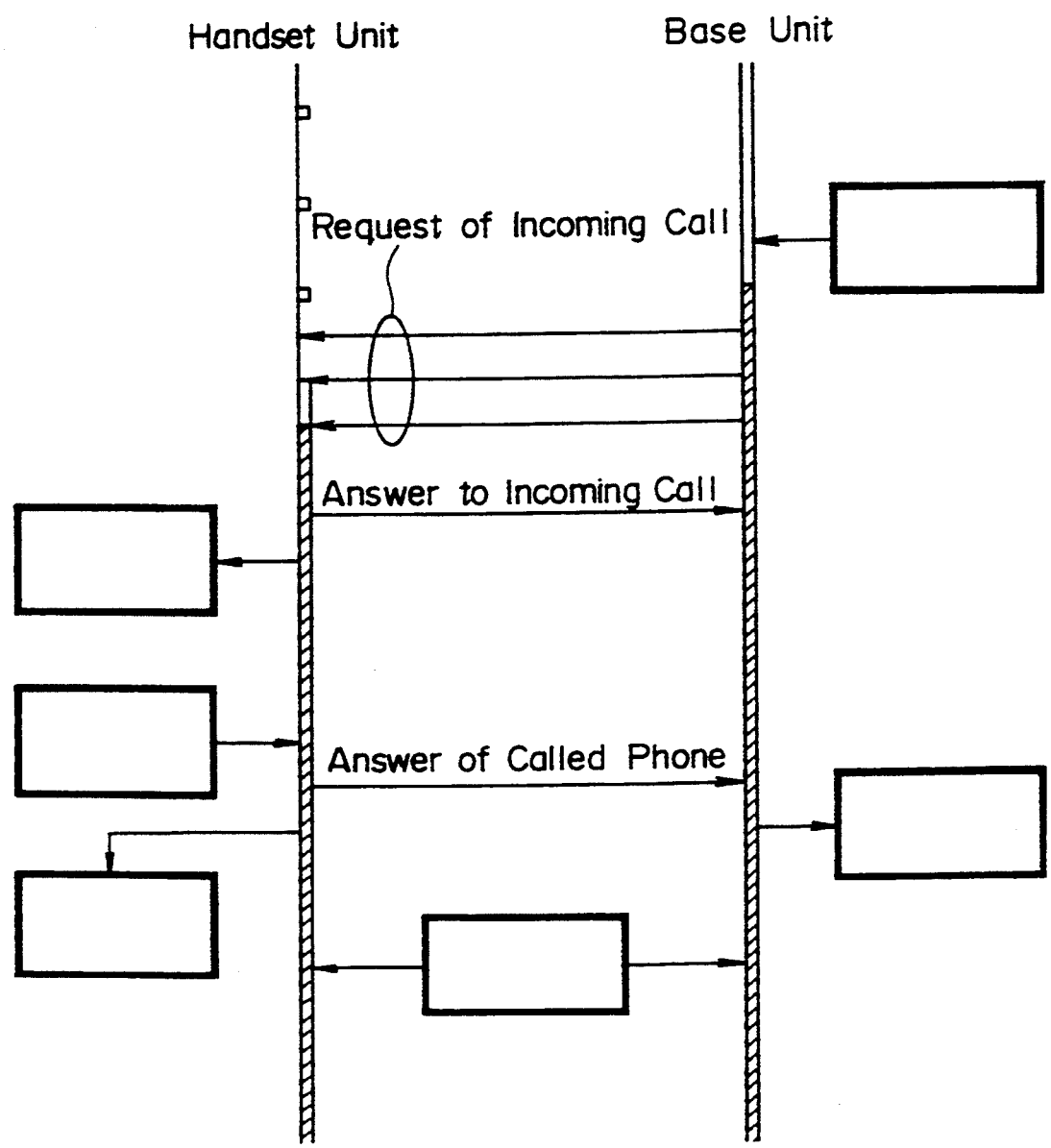
FIG. 5 is a diagram showing an operational sequence for an incoming call.

On the other hand, if the command signal CMND transmitted in step 411 is received by the handset unit 1 as represented by a YES at step 312, then the processing proceeds from step 312 to step 313. In step 313, a command signal CMND whose control code CTRL indicates a mode change to the hold mode is generated and this command signal CMND is transmitted to the base unit 2 and processing proceeds to step 314. In step 314, the transmitting circuit 110 and the receiving circuit 120 of FIG. 2 are muted by the control signals TCTL and RCTL, respectively, and the LED 161 is actuated. As a result, the handset unit 1 is placed in the hold mode.

After the handset unit 1 is placed in the hold mode, the processing proceeds to the next decision step 321, whereupon steps 321 to 324 may be repeated as hereinafter explained.

More Specifically, it is determined in decision step 321 whether or not the talk key 132 or the hold key 133 are depressed which would indicate a request to terminate the hold mode. If neither key is depressed as represented by a NO at step 321, then the processing proceeds from step 321 to the next decision step 322. It is determined in step 322 whether or not the command signal CMND whose control code CTRL indicates a mode change to the standby mode is received from the base unit 2 as hereinafter described. If such command signal CMND is not received as represented by a NO at step 322, then the processing proceeds from step 322 to the next decision step 323. In step 323, it is determined whether or not the command signal CMND whose control code CTRL indicates a channel change is received from the base unit 2 as hereinafter described. If this command signal CMND is not received as represented by a NO at step 323, then the processing proceeds from step 323 to the next decision step 324. It is determined in step 324 whether or not a predetermined time, for example, four minutes, has passed since the handset unit 1 was placed in the hold mode by execution of step 314. If the predetermined time has not passed as represented by a NO at step 324 then the processing returns from step 324 to step 321.

Accordingly, in the situation described above, steps 321 to 324 are repeated until four minutes have passed since the handset unit 1 entered the hold mode. Further, during this time, the conditions of the talk key 132 and the hold key 133 are monitored at step 321, the command signal CMND indicating a mode change to the standby mode is monitored at step 322 and the command signal CMND indicating a channel change is monitored at step 323.

It is determined in step 412 whether or not the command signal CMND which indicates a mode change to the hold mode transmitted in step 313 is received by the base unit 2. If this command signal CMND is received as represented by a YES at step 412, then the processing proceeds from step 412 to step 413. In step 413, the transmitting circuit 210 and the receiving circuit 220 are respectively muted by the control signals TCTL and RCTL and, as a result, the base unit 2 is also set in a hold mode.

After the base unit 2 is placed in the hold mode, the processing proceeds to the next decision step 421, whereupon steps 421, 422 and 423 may be repeated as described below.

More specifically, it is determined in step 421 whether or not the command signal CMND whose control code CTRL indicates the releasing of the hold mode is received from the handset unit 1 as hereinafter described. If this command signal CMND is not received as represented by a NO at step 421, then the processing proceeds from step 421 to the next decision step 422. It is determined at step 422 whether or not the hold key 233 is depressed. If the hold key 233 is not depressed as represented by a NO at step 422, then the processing proceeds from step 422 to step 423. It is determined in step 423 by observing the detecting signal SQLC whether or not the FM signal Su from the handset unit 1 is received. If the FM signal Su is received as represented by a YES, then the processing returns from step 423 to step 421.

Accordingly, after the base unit 2 is set in the hold mode and with the conditions described above, steps 421 to 423 are repeated. While these steps are repeated, the hold release command is monitored at step 421, the condition of the hold key 233 is monitored at step 422 and the presence or absence of the FM signal Su is monitored at step 423.

If the command signal CMND which indicates a mode change to the hold mode is not received as represented by a NO at step 412, then the processing proceeds from step 412 to step 414. In step 414, it is determined whether or not a predetermined time, for example, several seconds, has passed since step 411 was originally executed. If the predetermined time has not passed as represented by a NO at step 414, the processing returns from step 414 to step 411.

Accordingly, the command signal CMND indicating the answer to the hold mode request is transmitted in step 411 until the command signal CMND which indicates a mode change to the hold mode transmitted in step 313 is received in step 412 or until the predetermined time has passed as represented by a YES in step 414.

If it is determined in step 414 that the predetermined time has passed, then the processing proceeds from step 414 to step 413, whereat the base unit 2 is placed in the hold mode. In this case, since the hold key 133 is depressed in the handset unit 1 and the base unit 2 received the hold request command signal CMND, no trouble occurs.

In the above-mentioned hold mode, if the talk key 132 or the hold key 133 of the handset unit are subsequently depressed, so as to indicate a request to terminate the hold mode as represented by a YES at step 321, then the processing proceeds from step 321 to step 331. In step 331, a command signal CMND whose control code CTRL indicates the release of the hold mode is generated. This command signal CMND is transmitted to the base unit 2 and then the processing proceeds to step 332.

The hold release command CMND transmitted in step 331 is detected at step 421, as represented by a YES thereat, whereupon the processing proceeds from step 421 to step 431. In step 431, a command signal CMND whose control code CTRL indicates an answer to the hold release command is generated and transmitted to the handset unit 1. The processing then proceeds from step 431 to the next decision step 432.

The answer to the hold release command CMND transmitted in step 431 is received at step 332 and, as a result, a command signal CMND whose control code CTRL indicates the execution of the releasing of the hold mode is generated and transmitted to the base unit 2 at the next step 333. The processing proceeds to step 334 in which the transmitting circuit 110 and the receiving circuit 120 are released from the muted conditions by the control signals TCTL and RCTL, respectively. Thus, the LED 161 is turned OFF and the handset unit 1 is released from the hold mode. Thereafter, the processing returns to step 301 and the handset unit 1 is set in the communication mode.

It is determined in step 432 whether or not the command signal CMND whose control code CTRL indicates the execution of the releasing of the hold mode is received by the base unit 2. If this command signal CMND is received, as represented by a YES at step 432, then the processing proceeds from step 432 to step 433. In step 433, the transmitting circuit 210 and the receiving circuit 220 are respectively released from the muted conditions by the control signals TCTL and RCTL, whereupon the base unit 2 is released from the hold mode.

Thereafter, the processing returns to step 401 and the base unit 2 is also set in the communication mode. Accordingly, telephone communication is again made possible by the handset unit 1 via the base unit 2.

If, on the other hand, the command signal CMND which indicates the execution of the releasing of the hold mode transmitted in step 333 is not received by the base unit 2 as represented by a NO at step 432, then the processing proceeds from step 432 to the next decision step 434. It is determined in step 434 whether or not a predetermined time, for example, several seconds, has passed since step 431 was originally executed. If the predetermined time has not passed as represented by a NO, then the processing returns from step 434 to step 431.

Accordingly, the transmission of the command signal CMND which indicates the answer to the release command is repeated in step 431 and the determination of whether the command signal CMND whose control code CTRL indicates the execution of the releasing of the hold mode is received is continued in step 432 until this command signal is received in step 432 or until the predetermined time has passed as described below.

If the predetermined time has passed as represented by a YES at step 434, then the processing proceeds from step 434 to step 433, whereat the base unit 2 is released from the hold mode. The processing then returns from step 433 to step 401, whereupon the telephone conversation may be resumed.

Although in the above situation the command signal CMND whose control code CTRL indicates the execution of the releasing of the hold mode was not received in step 432 because the predetermined time passed and the telephone conversation was nevertheless resumed since the hold mode releasing command was issued by depressing the talk key 132 or the hold key 133 in the handset unit 1 and the hold mode releasing command CMND was received at step 421 by the base unit 2, the processing may proceed from step 434 to step 433 when the predetermined time has passed without any problems.

An operation in which a telephone conversation is resumed from the base unit 2 will be explained below. In this operation, the telephone conversation is effected by utilizing the handset unit 1, after which the handset unit 1 is placed in a hold mode as set forth above and the hold mode of the handset unit 1 is thereafter released by the base unit 2, thus allowing the telephone conversation to be resumed by using the transmitter 211 and receiver 221 of the base unit 2.

More specifically, if the hold key 233 of the base unit 2 is depressed after the base unit is placed in the hold mode, such depression of the hold key 233 is detected in step 422, as represented by a YES thereat, whereupon the processing proceeds from step 422 to step 441. In step 441, a command signal CMND whose control code CTRL indicates a mode change to the standby mode is generated and transmitted to the handset unit 1. The processing then proceeds to the next decision step 442.

The command signal CMND transmitted in step 441 is detected by the handset unit 1 at step 322 as represented by a YES. As a result, the processing proceeds from step 322 to step 341 whereat a command signal CMND whose control code CTRL indicates an answer to the mode change to the standby mode is generated and transmitted to the base unit 2. The processing then proceeds from step 341 to the next decision step 342.

It is determined in step 442 whether or not the command signal CMND whose control code CTRL indicates the answer to the mode change to the standby mode transmitted in step 341 is received. If this command signal CMND is received as represented by a YES at step 442, then the processing proceeds from step 442 to step 443. In step 443, a command signal CMND whose control code CTRL indicates the change to the standby mode is generated and transmitted to the handset unit 1. Thereafter, the processing proceeds from step 443 to step 490. In step 490, the transmission and the reception of the transmitting circuit 210 and the receiving circuit 220 are respectively inhibited by the control signals TCTL and RCTL and the transmitter 211 and the receiver 221 are connected to the telephone line network 3 via the converting circuit 261 and the switch circuit 262. As a result, the telephone conversation can be resumed by means of the transmitter 211 and receiver 221.

It is determined in step 342 whether or not the command signal CMND whose control code CTRL indicates the change to the standby mode is received by the handset unit 1. If such command signal CMND is received as represented by a YES at step 342, then the processing proceeds from step 342 to step 390. In step 390, the LED 161 is turned OFF, thus announcing that the handset unit 1 is released from the hold mode. The handset unit 1 is then set in the standby mode wherein the two channels indicated by the channel data CHDT are alternately and intermittently received and monitored as earlier noted with reference to FIG. 1. In order to make an outgoing call when the handset unit 1 is in the standby mode, the handset unit is connected to the base unit 2 via a vacant channel from among the two channels indicated by the channel data CHDT. Thus, the handset unit 1 is placed in the standby mode for intermittently receiving the two channels as previously described.

If the command signal CMND whose control code CTRL indicates the answer to the change to the standby mode transmitted in step 341 is not received by the base unit 2, as represented by a NO at step 442, then the processing proceeds from step 442 to step 444. It is determined in step 444 whether or not a predetermined time, for example, several seconds, has passed since step 441 was originally executed. If the predetermined time has not passed as represented by a NO at step 444, then the processing returns from step 444 to step 441. If, on the other hand, the predetermined time has passed as represented by a YES at step 444, then the processing proceeds from step 444 to step 490.

Accordingly, if the answer to the change to the standby mode command signal CMND transmitted in step 341 is not received as represented by a NO at step 442, the transmission of the command signal CMND for the mode change to the standby mode is repeated in step 441 and the determination of whether the answer to the command signal CMND is received is continued in step 442 until this command signal is received in step 442 or until the predetermined time has passed as described below.

However, if the predetermined time has passed, as represented by a YES at step 444, telephone communication is allowed by means of the transmitter 211 and the receiver 221 in step 490, regardless of the results of steps 441 and 442, because the transmitter 211 and the receiver 221 are placed in the on-hook state.

If the standby mode command signal CMND transmitted in step 443 is not received by the handset unit 1 as represented by a NO at step 342, then the processing proceeds from step 342 to the next decision step 343. In step 343, it is determined whether or not a predetermined time, for example, several seconds, has passed since the step 341 has been executed. If the predetermined time has not passed as represented by a NO at step 343, then the processing returns from step 343 to step 342. If, on the other hand, the predetermined time has passed as represented by a YES at step 343, then the processing proceeds from step 343 to step 390.

Accordingly, if the command signal CMND which answers the change to the standby mode is transmitted in step 341, then the handset unit 1 awaits the arrival of the standby mode command signal CMND of step 443 for several seconds. If the handset unit 1 fails to receive this command signal CMND after having waited several seconds, then the processing proceeds to step 390 whereat the handset unit 1 is released from the hold mode and placed in the standby mode so as to intermittently receive the two channels.

In the above case, since the handset unit 1 receives the standby mode command in step 322 and answers this command in step 341, the processing may proceed from step 343 to step 390 without causing any problems.

As described above, the handset unit 1 can be released from the hold mode by the base unit 2 and the telephone conversation can be resumed. At the time the handset unit 1 is released from its hold mode, the handset unit is set in the standby mode.

A situation in which the up channel interrupted will now be explained. Frequently, it is observed that when the user places the handset unit 1 on a table or the like, the condition of the radio wave (FM signal Su) transmitted by the handset unit 1 is suddenly changed so as to interrupt the reception thereof by the base unit 2.

More specifically, if the FM signal Su no longer received by the base unit 2, then the detection signal SQLC is changed accordingly and this change is detected in step 423 as represented by a NO. The processing then proceeds from step 423 to step 451.

In step 451, a command signal CMND whose control code CTRL indicates a channel change is generated and transmitted to the handset unit 1. The processing proceeds to step 452, in which the channel is changed to the next channel.

The channel changing command signal CMND transmitted in step 451 is detected by the handset unit 1 at step 323, as represented by a YES, and then the processing proceeds from step 323 to step 351. In step 351, A search for vacant channels is conducted and one vacant channel is selected. In the next step 352, a command signal CMND whose control code CTRL indicates a connection request for the hold mode is generated and transmitted through the vacant channel selected in step 351. Thereafter, the processing proceeds to step 353.

Steps 452 to 455 may be repeated in the base unit 2 as hereinafter described. More specifically, it is determined in step 453 whether or not the command signal.

CMND transmitted in step 352 whose control code CTRL indicates the connection request for the hold mode is received. If this command signal CMND is not received as represented by a NO at step 453, then the processing proceeds from step 453 to the next decision step 454. In decision step 454, it is determined whether or not the command signal CMND whose control code CTRL indicates a request for an outgoing call from the handset unit 1 is received. If this command signal is not received as represented by a NO at step 454, then the processing proceeds from step 454 to the next decision step 455. It is determined in decision step 455 whether or not the hold key 233 is depressed. If the hold key 233 is not depressed as represented by a NO at step 455, then the processing returns from step 455 to step 452.

If, on the other hand, the hold connection request command CMND of step 352 is received, as represented by a YES at step 453, the processing proceeds from step 453 to step 456. In step 456, a command signal CMND whose control code CTRL indicates an answer to the hold connection request is generated and transmitted to the handset unit 1. The processing then returns from step 456 to step 421.

If the command signal CMND for the outgoing call request from the handset unit 1 is received, as represented by a YES at step 454, the processing proceeds from step 454 to step 431. Further, if the hold key 233 is depressed, as represented b;y a YES at step 455, the processing proceeds from step 455 to step 490.

Accordingly, when the base unit 2 can no longer receive the FM signal Su from the handset unit 1, the base unit transmits a channel change command to the handset unit in step 451 and then awaits a hold connection request in a vacant channel in step 453. If the base unit 2 receives the hold connection request, the base unit answers such hold connection request in step 456 and is placed again in the hold mode.

Further, while the base unit 2 is awaiting the hold connection request in the vacant channel in step 453, the base unit checks for a request of an outgoing call from the handset unit 1 in step 454 and also checks the off-hook state of the transmitter 211 and the receiver 221 in step 455.

It is determined in step 353 whether or not the command signal CMND whose control code CTRL indicates the answer to the hold connection request transmitted in step 456 is received by the handset unit 1. If this command signal CMND is received as represented by a YES at step 353, then the processing returns from step 353 to step 321.

If, on the other hand, the command signal CMND whose control code CTRL indicates the answer to the hold connection request transmitted in step 456 is not received by the handset unit 1 as represented by a NO at step 353, then the processing proceeds from step 353 to the next decision step 354. In decision step 354, it is determined whether or not a predetermined time, for example, four minutes, has passed since the step 314 has been executed in which the handset unit 1 was placed in the hold mode. If the predetermined time has not passed as represented by a NO at step 354, then the processing returns from step 354 to step 351.

Accordingly, when the handset unit 1 receives the command signal CMND indicating a channel change from the base unit 2, the handset unit 1 searches for a vacant channel in step 351, requests a connection for the hold mode in step 352, receives an answer to the hold connection request in step 353 and is placed again in the hold mode through step 321 provided the duration of the hold mode is less than four minutes.

On the other hand, if four minutes have passed since the handset unit 1 entered the hold mode, as represented by a YES at step 354, then the processing proceeds from step 354 to step 390. In step 390, the handset unit 1 is released from the hold mode whereupon the LED 161 is turned off and is placed in the previously described standby mode.

Although the channel change command is generated and transmitted because the base unit 2 cannot receive the FM signal Su from the handset unit 1, if the channel is not connected within four minutes as previously described, the handset unit 1 is placed in the standby mode.

As previously described, while the handset unit 1 is in the hold mode, the steps 321 to 324 may be repeated. However, if four minutes have passed since the handset unit 1 is placed in the hold mode, as detected in step 324, and as represented by a YES thereat, the processing proceeds from step 324 to step 390.

Consequently, if the duration of the hold mode is four minutes, the handset unit 1 is placed in the standby mode whereupon the LED 161 is turned OFF and, as a result, the power consumption of the battery 151 is reduced.

At this time, since the base unit 2 cannot receive the FM signal Su from the handset unit 1, the processing proceeds from steps 423 and 451 to the loop formed of steps 452 to 455 as previously described.

Accordingly, after the predetermined time has passed since the handset unit 1 has been placed in the hold mode or by making an outgoing call by depressing the talk key 132 of the handset unit 1, step 431 is executed and the handset unit 1 is released from the hold mode. Alternatively, by depressing the hold key 233 of the base unit 2, step 490 is executed thus releasing the base unit 2 from the hold mode.

Thus, according to an embodiment of the present invention, the hold mode processings are executed as described above. For example, if the condition of the FM signal Su transmitted by the handset unit 1 or the condition of the FM signal Sd received is suddenly changed so that the hold release command signal CMND cannot be accessed by the base unit 2, the handset unit may be released from the hold mode by step 324 after 4 minutes have passed since the handset unit was placed in the hold mode and placed in the standby mode in step 390, thus reducing the power consumption of the battery 151.

An operation in which the base unit 2 is set in the hold mode during a telephone communication made by the base unit 2 will now be explained.

Figure 11A:
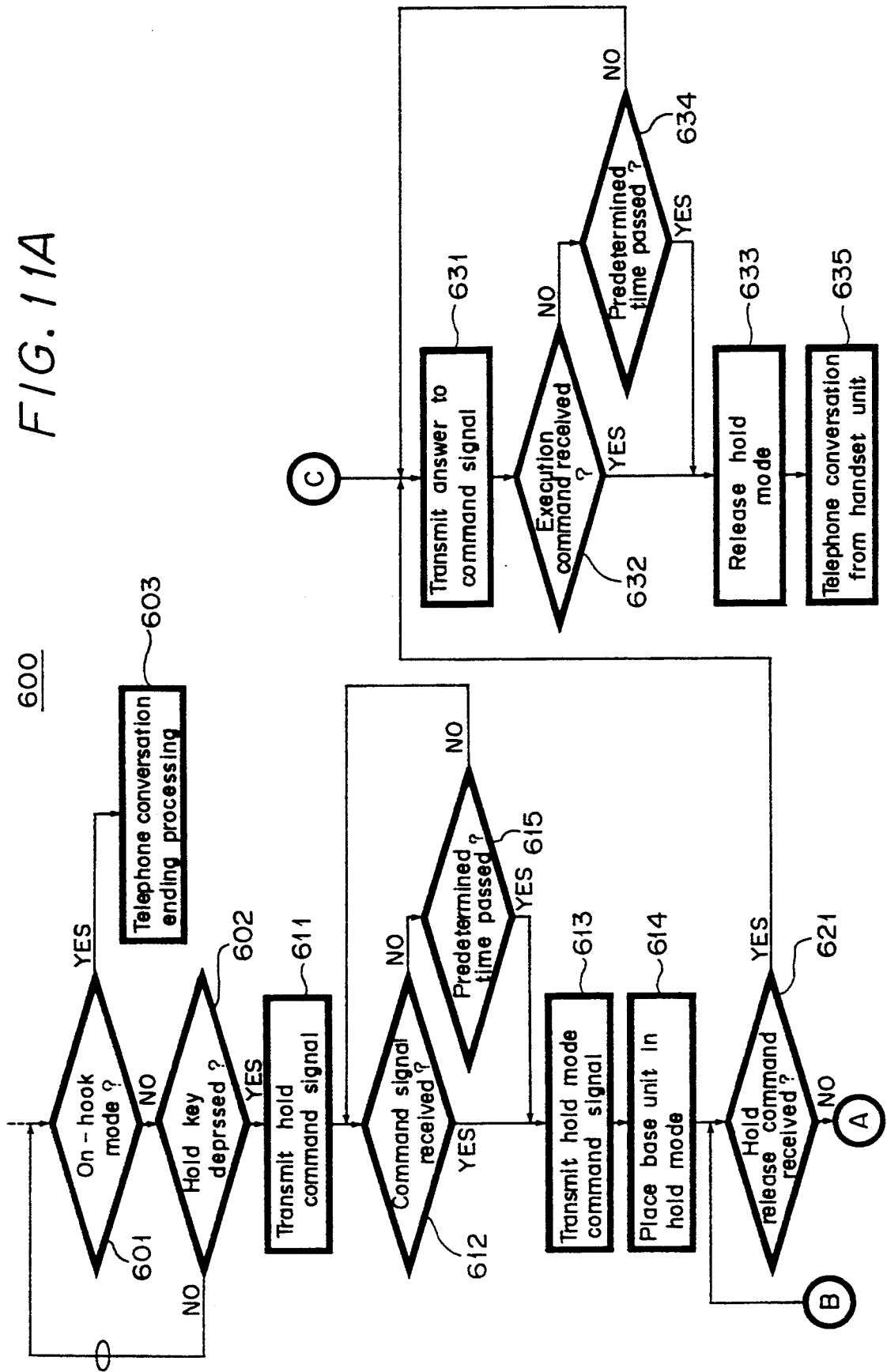
FIGS. 11A and 11B illustrate a flowchart to which reference will be made in explaining another operation of the base unit.
Figure 11B:
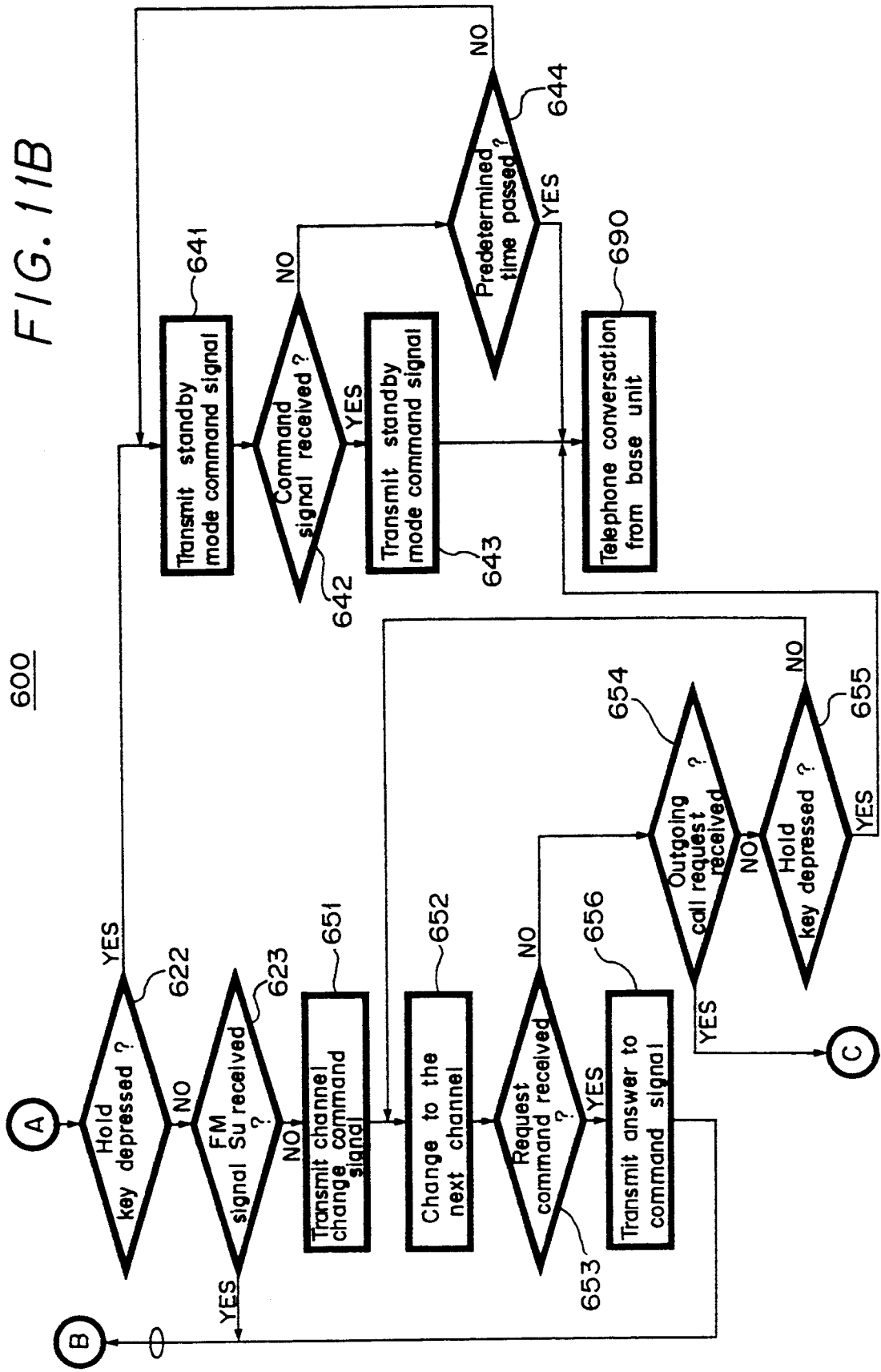

Routines 500 and 600 as shown in the flowcharts of FIGS. 10 and 11, respectively, are processed by the microcomputer 140 of the handset unit 1 and the microcomputer 240 of the base unit 2, respectively.

FIGS. 9A and 9B show protocols of data processing associated with the hold mode. The reference numerals in parentheses at the two sides designate reference numerals of respective steps of the routines 500 and 600.

When a telephone conversation is made by using the base unit 2, the handset unit 1 is in the standby mode and steps 501 and 502 in the routine 500 are repeated.

More specifically, as shown in FIG. 10, the handset unit 1 is set in the sleep mode in step 501 of, for example, 3.5 seconds as previously described, and then it is determined at step 502 whether or not an FM signal Sd from the base unit 2 is received through the third channel or the seventh channel as more fully explained hereinafter. If the FM signal Sd is not received as represented by a NO at step 502, then the processing returns from step 502 to step 501.

Figure 1:
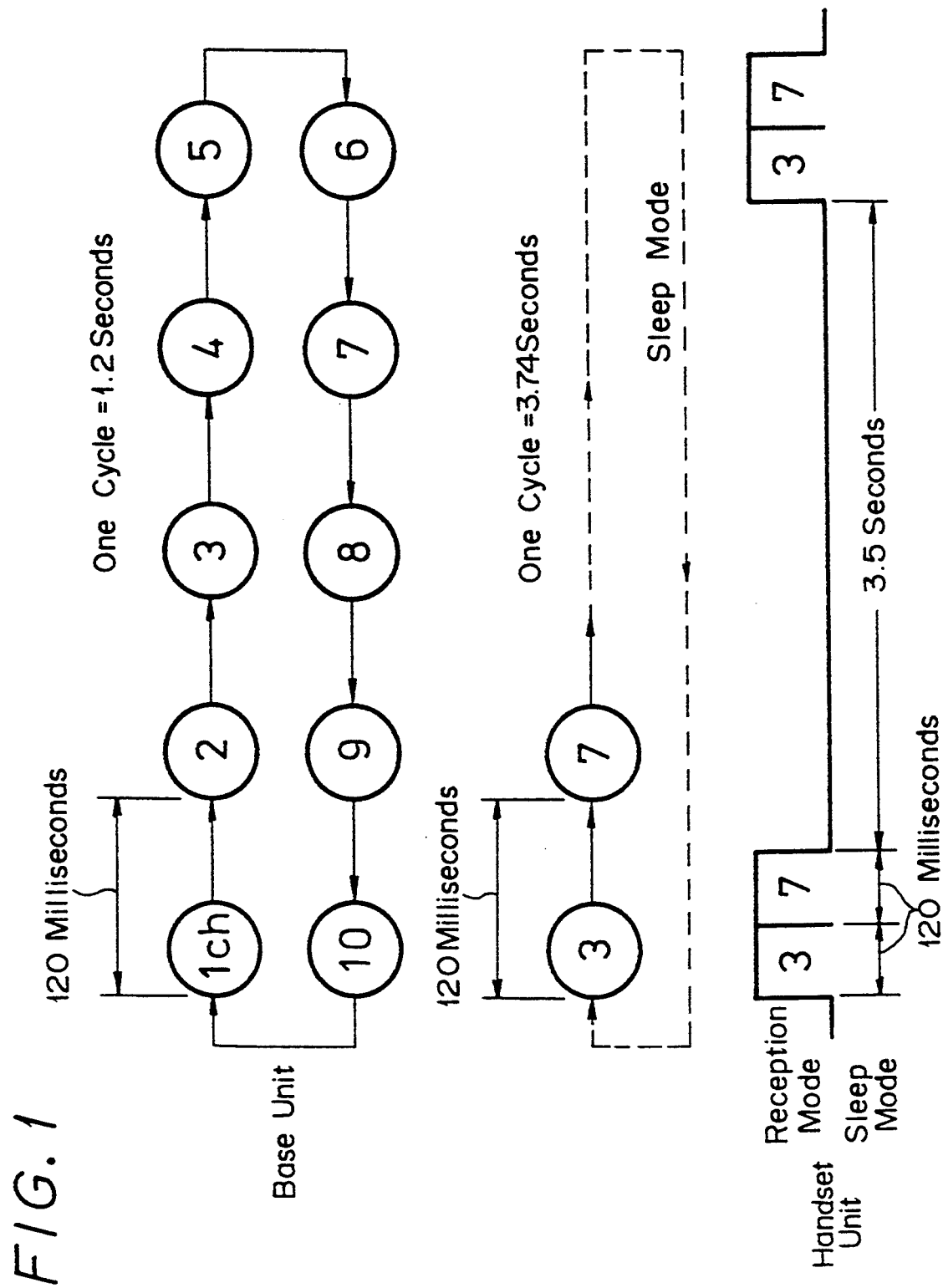
FIG. 1 is a timing chart used to explain a way of reducing the power consumption of a battery of a handset unit.

Thus, in the above condition, the handset unit i is placed in the standby mode, which was previously explained with reference to FIG. 1, at steps 501 and 502.

If the handset unit 1 is requested to perform specific processing as would occur, for example, if the talk key 132 is depressed, the processing of the microcomputer 140 proceeds from step 501 to step 503, whereupon the requested processing is executed and than the processing of the microcomputer 140 is returned from step 503 to step 501.

Further, when the telephone communication is made by the use of the base unit 2, steps 601 and 602 of the routine 600 are repeated in the base unit 2.

More specifically, as shown in FIG. 11, it is determined in step 601 by checking the output of the switch 232 whether or not the transmitter 211 and the receiver 221 are set in the on-hook state. If the transmitter 211 and the receiver 221 are not set in the on-hook state as represented by a NO at step 601, then the processing proceeds from step 601 to the next decision step 602. It is determined in step 602 whether or not the hold key 233 is depressed. If the hold key 233 is not depressed as represented by a NO at step 602, then the processing returns from step 602 to step 601.

Accordingly, during the telephone communication., the on-hook state of the transmitter 211 and the receiver 221 and the depression of the hold key 233 are continuously checked at steps 601 and 602, respectively.

On the other hand, if the transmitter 211 and the receiver 221 are set in the on-hook state, such on-hook state is detected at step 601 as represented by a YES thereat, whereupon the processing proceeds from step 601 to step 603 whereat the conversation ending processing is executed.

Further, if the hold key 233 is depressed during the telephone communication from the base unit 2, as represented by a YES at step 602, the processing proceeds from step 602 to step 611. In step 611, a command signal CMND whose control code CTRL indicates a request for the hold mode is generated and transmitted to the handset unit 1. The processing then proceeds to the next decision step 612.

The FM signal Sd transmitted through the command signal CMND in step 611 is detected by the handset unit 1 at step 502 as represented by a YES, whereupon the processing proceeds from step 502 to the next decision step 511. It is determined in decision step 511 whether or not the transmitted command signal CMND is substantially identical to the command signal CMND of the hold mode. If the transmitted signal is the command signal CMND of the hold mode as represented by a YES at step 511, then the processing proceeds from step 511 to step 512. In step 512, a command signal CMND whose control code CTRL indicates an answer to the hold request is generated and transmitted to the base unit 2. The processing then proceeds from step 512 to the next decision step 513.

If the command signal CMND of the answer to the hold request transmitted in step 512 is received by the base unit 2 as represented by a YES at step 612, then the processing proceeds from step 612 to step 613. In step 613, a command signal CMND whose control code CTRL indicates a mode change to the hold mode is generated and transmitted to the handset unit 1. In the next step 614, the transmitting circuit 210 and the receiving circuit 220 are muted by the control signals TCTL and RCTL, respectively, thus placing the base unit 2 in the hold mode.

If the base unit 2 is placed in the hold mode at step 614, then the processing proceeds to the next decision step 621, whereupon steps 621, 622 and 623 may be repeated as described below.

Steps 621, 622 and 623 respectively execute processings which are substantially the same as those in steps 421, 422 and 423 of FIG. 8 and, as such, will not be further described.

If, on the other hand, the command signal CMND whose control code CTRL indicates the answer to the hold request is not received as represented by a NO at step 612, then the processing proceeds from step 612 to decision step 615. It is determined in decision step 615 whether or not a predetermined time, for example, several seconds, has passed since step 611 has been executed. If the predetermined time has not passed as represented by a NO at step 615, then the processing returns from step 615 to step 612.

Accordingly, steps 612 and 615 may be repeated until the command signal CMND whose control code CTRL indicates the answer to the hold request transmitted in step 512 is received by the base unit 1 or until the predetermined time has passed at step 615 as described below.

If the predetermined time has passed as represented by a YES at step 615, then the processing proceeds from step 615 to steps 613 and 614 as previously described whereat the base unit 2 is placed in the hold mode. This situation does not present a problem since the hold key 233 was depressed in the base unit 2 and the handset unit 1 had received the command signal CMND whose control code CTRL indicates the request of the hold mode.

In the handset unit 1, it is determined in decision step 513 whether or not the command signal CMND whose control code CTRL indicates the mode change to the hold mode transmitted by the base unit 2 in step 613 is received. If the command signal CMND is received as represented by a YES at step 513, then the processing proceeds from step 513 to step 514. In step 514, the transmitting circuit 110 and the receiving circuit 120 are muted by the control signals TCTL and RCTL, respectively, and the LED 161 is activated. As a result, the handset unit 1 is also placed in the hold mode.

If the handset unit 1 is placed in the hold mode, then the processing proceeds to the next decision step 521, whereupon steps 521, 522, 523 and 524 may be repeated as hereinafter described. The processings performed in steps 521, 522, 523 and 524 are substantially the same as those of steps 321, 322, 323 and 324, respectively, of FIG. 7 and therefore will not be further described.

If on the other hand, at step 511, the command signal CMND is not the command signal CMND whose control code CTRL indicates the request of the hold mode as represented by a NO at step 511, then the processing proceeds from step 511 to step 515, in which the processing associated with the transmitted command signal CMND is performed. The processing then returns to step 501.

Further, if the command signal CMND whose control code CTRL indicates the mode change to the hold mode is not received by the handset unit 1 as represented by a NO at step 513, then the processing proceeds from step 513 to decision step 516. In decision step 516, it is determined whether or not a predetermined time, for example, several seconds, has passed since step 511 has been executed. If the predetermined time has not passed as represented by a NO at step 516, then the processing returns from step 516 to step 512.

Accordingly, the command signal CMND whose control code CTRL indicates the answer to the hold request is transmitted in step 512 until the hold mode change command signal CMND of step 613 is received in step 513 or until the predetermined time has passed at step 516 as hereinafter described.

If the predetermined time has passed as represented by a YES at step 516, then the processing proceeds from step 516 to step 514 whereat the handset unit 1 is placed in the hold mode. This situation does not present a problem since the hold key 233 was depressed in the base unit 2 and the command signal. CMND whose control code CTRL indicates the request of the hold mode was already received by the handset unit 1.

An operation in which the hold mode is released by the handset unit 1 will now be explained. In this case, a telephone conversation is made by utilizing the base unit 2, thereafter the base unit 2 is placed in the above-mentioned hold mode and is released from the hold mode by the handset unit 1, thereby permitting the telephone conversation to be resumed by the transmitter 111 and the receiver 121.

More specifically, during the above-mentioned hold mode, if the talk key 132 or the hold key 133 of the handset unit 1 is depressed, which is detected at decision step 521 of FIG. 10 as represented by a YES thereat, then the processing proceeds from step 521 to step 531. In step 531, a command signal CMND whose control code CTRL indicates the releasing of the hold mode is generated and transmitted to the base unit 2. Thereafter, the processing proceeds to steps 532,533,534 and 535. Steps 521, 531, 532, 533, 534 and the corresponding steps 621, 631, 632, 633,634 of the base unit 2 execute substantially the same processings as those of the steps 321, 331, 332, 333, 334 of FIG. 7 and the steps 421, 431, 432,433,434 of FIG. 8, respectively, and therefore will not be further described. As a result, in the handset unit 1, the LED 161 is turned OFF at step 534, and the telephone conversation from the handset unit 1 may be resumed at step 535. Further, the base unit 2 can receive an incoming call from the handset unit 1 in step 635.

An operation in which a telephone conversation may be resumed again from the base unit 2 will now be explained. In this case, the telephone conversation is made by utilizing the base unit 2, thereafter the base unit 2 is placed in the above-mentioned hold mode and the base unit 2 is released from the hold mode, thereby allowing the telephone conversation to be resumed again by utilizing the transmitter 211 and the receiver 221.

More specifically, during the hold mode, if the hold key 233 of the base unit 2 is depressed, which is detected at step 622 as represented by a YES thereat the processing proceeds from step 622 to step 641. In step 641, a command signal CMND whose control code CTRL indicates a mode change to the standby mode is generated and transmitted to the handset unit 1. The processing then proceeds to the next decision step 642.

Steps 622, 641, 642 and the following steps 643, 644, 690 and the corresponding steps 522, 541, 542, 543 of the handset unit 1 execute substantially the same processings as those of the steps, 422, 441, 442, 443, 444, 490 of FIG. 8 and the steps 322, 341, 342, 343 of FIG. 7, respectively, and therefore will not be further described. As a result, if the command signal CMND whose control code CTRL indicates the mode change is received as represented by a YES at step 542 or if the predetermined time has passed as represented by a YES at step 543, then the LED 161 is turned OFF and the handset unit 1 is returned to the sleep mode.

An operation in which the up channel FM signal Su is interrupted will now be explained. In this case, while the handset unit 1 is in the hold mode, the condition of the radio wave (FM signal Su) transmitted by the handset unit 1 is suddenly changed so as to prevent the reception thereof by the base unit 2.

More specifically, as shown in FIG. 11, if the FM signal Su is no longer received by the base unit 2, the detection signal SQLC is changed accordingly and this change is detected at step 623 as represented by a NO. The processing then proceeds from step 623 to step 651. The steps 623, 651 and the following steps 652, 653, 654, 655, 690 of the base unit 2 and the corresponding steps 523, 551, 552, 553, 554 of the handset unit 1 execute substantially the same processings as those of the steps 423, 451, 452, 453, 454, 455, 490 of FIG. 8 and the steps 323, 351, 352, 353, 354 of FIG. 7, respectively, and therefore will not be further described. As is to be appreciated, if the predetermined time, for example, four minutes, has passed as represented by a YES at step 554, then the LED 161 is turned OFF and the processing returns to step 501, whereby the handset unit 1 is set in the sleep mode.

When the handset unit 1 is placed in the hold mode, steps 521 to 524 may be repeated in the handset unit 1. If four minutes have passed since the handset unit 1 has been set in the hold mode, this condition is detected at step 524 as represented by a YES, and the processing returns from step 524 to step 501.

Accordingly, if the hold mode is continued for four minutes, then the handset unit 1 is placed in the standby mode, thus reducing the power consumption of the battery 151.

If the FM signal Su from the handset unit 1 is no longer received by the base unit 2, then the processing proceeds to the loop formed of steps 652 to 655 from step 623 through step 652 as previously described.

According to this invention, the processings in the hold mode are executed as described above. In this case, since the handset unit 1 is also set in the hold mode when the communication is held in the base unit 2, the hold mode of the base unit 2 can be released by the handset unit 1 and the telephone communication can be resumed.

After the handset unit 1 is placed in the hold mode, even if the conditions of the FM signal Su transmitted from the handset unit 1 and the FM signal Sd received by the handset unit 1 are suddenly changed so that the base unit 2 can no longer access the hold release command signal CMND, the handset unit 1 may be released from the hold mode after four minutes have passed since the handset unit 1 was placed in the hold mode by the steps 324 and 524. The handset unit 1 is then placed in the standby mode or the sleep mode as previously described, thereby reducing the power consumption of the battery 151.

Furthermore, since the handset unit 1 is also set in the hold mode when a telephone conversation is held by the base unit 2, the base unit 2 can be released from its hold mode by the handset unit 1 and, as a result, allow the telephone conversation to be resumed as previously described.

Having described a preferred embodiment of the present invention with reference to the accompanying drawings, it is to be understood that the invention is not limited to that precise embodiment, and that various changes and modifications thereof could be effected by one skilled in the art without departing from the spirit or scope of the invention as defined in the appended claims.

We claim as our invention:

1. A cordless telephone apparatus comprising:
a base unit connected to a telephone line network for connection through the latter with a desired party;
a handset unit operable upon opening of a communication channel selected from among a plurality of communication channels for radio communication of informational and mode control signals with said base unit so as to enable communication of said informational signals through the telephone line network with said desired party and having means for establishing an initiating and terminating mode in which said radio communication between said base unit and said handset unit is respectively initiated and terminated;
means for establishing a low power standby mode in which said handset unit intermittently monitors at least one predetermined communication channel from among said plurality of communication channels and said base unit monitors all of said plurality of communication channels;
means automatically responsive to an interruption of said radio communication between said handset and said base unit for establishing a channel changing mode in which said communication channel opened between said base unit and said handset unit is changed to another of said communication channels;
means for establishing and releasing a hold mode in which the communication of said informational signals between said handset unit and said desired party is inhibited when said hold mode is established; and
means for continuously monitoring said communication channel opened between said base unit and said handset unit for a predetermined period after initiation of said hold mode so as to detect one of said mode control signals indicating termination of said radio communication, releasing of said hold mode and establishing of said channel changing mode for changing of said communication channel opened between said base unit and said handset unit, respectively, and, in the absence of detection of any of said mode control signals, for placing said handset unit in said stand-by mode after said predetermined period.

* * * * *